United States Patent
Somlai-Fischer et al.

(10) Patent No.: US 11,704,626 B2
(45) Date of Patent: Jul. 18, 2023

(54) RELOCATION OF CONTENT ITEM TO MOTION PICTURE SEQUENCES AT MULTIPLE DEVICES

(71) Applicant: Prezi, Inc., San Francisco, CA (US)

(72) Inventors: Adam Somlai-Fischer, Budapest (HU); Zsuzsa Weiner, Budapest (HU); Jeremy Samuel Eccles, Berlin (DE)

(73) Assignee: Prezi, Inc., San Francisco, CA (US)

( * ) Notice: Subject to any disclaimer, the term of this patent is extended or adjusted under 35 U.S.C. 154(b) by 0 days.

(21) Appl. No.: 17/532,399

(22) Filed: Nov. 22, 2021

(65) Prior Publication Data

US 2023/0008575 A1 Jan. 12, 2023

Related U.S. Application Data

(60) Provisional application No. 63/220,098, filed on Jul. 9, 2021.

(51) Int. Cl.
| | | |
|---|---|---|
| *G06F 3/01* | (2006.01) | |
| *G06F 3/04812* | (2022.01) | |
| *G06F 3/14* | (2006.01) | |
| *G06Q 10/10* | (2023.01) | |

(52) U.S. Cl.
CPC ............ *G06Q 10/103* (2013.01); *G06F 3/017* (2013.01); *G06F 3/04812* (2013.01); *G06F 3/1454* (2013.01)

(58) Field of Classification Search
None
See application file for complete search history.

(56) References Cited

U.S. PATENT DOCUMENTS

| | | | | |
|---|---|---|---|---|
| 5,657,246 | A * | 8/1997 | Hogan | H04N 7/142 348/14.03 |
| 7,054,904 | B2 * | 5/2006 | Ludwig | H04L 12/1818 709/205 |
| 8,099,462 | B2 * | 1/2012 | Sheng | G06F 3/0481 709/204 |
| 8,380,866 | B2 * | 2/2013 | Savitzky | G06F 40/169 709/204 |
| 8,766,983 | B2 * | 7/2014 | Marks | A63F 13/79 345/473 |
| 9,661,265 | B2 * | 5/2017 | Kim | H04N 7/147 |
| 9,699,411 | B2 * | 7/2017 | Nelson | H04M 3/567 |
| 9,813,255 | B2 * | 11/2017 | Tandon | H04N 7/141 |

(Continued)

*Primary Examiner* — Stella Higgs
(74) *Attorney, Agent, or Firm* — Schwegman, Lundberg & Woessner, P.A.

(57) ABSTRACT

An electronic presentation system comprising: one or more computer processors operatively coupled to one or more computer memories storing a set of instructions for configuring the one or more computer processors to perform operations comprising: causing display of a motion picture image sequence (MPIS) captured at a first computing device, within display screens at multiple computing devices; causing display of first multiple content items, on the display screens of the multiple computing devices, separate from the MPIS; and based at least in part upon receiving at the presentation management system from the first computing device, first relocation information indicating a first content item, causing relocation of display of the of the first content item, to within the MPIS displayed at the multiple computing devices.

35 Claims, 18 Drawing Sheets

(56) References Cited

U.S. PATENT DOCUMENTS

| | | | |
|---|---|---|---|
| 9,961,302 B1* | 5/2018 | Henderson | H04N 7/152 |
| 10,091,260 B2* | 10/2018 | Sanso | G06F 40/166 |
| 10,271,010 B2* | 4/2019 | Gottlieb | H04N 7/141 |
| 10,321,096 B2* | 6/2019 | Morabia | H04L 65/1093 |
| 10,509,964 B2* | 12/2019 | Astavans | H04N 7/152 |
| 11,134,217 B1* | 9/2021 | Goel | G06V 40/174 |
| 11,228,627 B1* | 1/2022 | Rangarajan | H04L 12/1818 |
| 11,317,060 B1* | 4/2022 | Libin | H04N 7/157 |
| 11,463,499 B1* | 10/2022 | Fieldman | H04L 65/403 |
| 2003/0084169 A1* | 5/2003 | Zhu | H04L 9/40 709/229 |
| 2004/0236830 A1* | 11/2004 | Nelson | H04L 65/403 709/204 |
| 2006/0107303 A1* | 5/2006 | Erhart | H04N 7/147 725/135 |
| 2006/0152575 A1* | 7/2006 | Amiel | H04N 7/147 348/14.01 |
| 2011/0072366 A1* | 3/2011 | Spencer | G06F 3/0486 715/757 |
| 2011/0150194 A1* | 6/2011 | Narayanaswamy | H04L 12/16 379/93.21 |
| 2011/0268418 A1* | 11/2011 | Jones | H04L 12/1831 348/E7.083 |
| 2011/0270922 A1* | 11/2011 | Jones | G06F 3/0488 709/204 |
| 2012/0206558 A1* | 8/2012 | Setton | H04N 7/157 348/E7.083 |
| 2012/0229590 A1* | 9/2012 | Barrus | H04N 7/15 348/E7.078 |
| 2012/0284197 A1* | 11/2012 | Sitrick | G06Q 10/0631 705/301 |
| 2012/0306993 A1* | 12/2012 | Sellers-Blais | H04L 65/80 348/14.08 |
| 2012/0317483 A1* | 12/2012 | Shapiro | H04L 65/103 715/753 |
| 2012/0327172 A1* | 12/2012 | El-Saban | G06T 7/174 348/14.02 |
| 2013/0027425 A1* | 1/2013 | Yuan | G06F 3/0484 345/629 |
| 2013/0290861 A1* | 10/2013 | Chen | H04L 65/4015 715/744 |
| 2014/0002578 A1* | 1/2014 | Rosenberg | H04N 7/141 348/E7.083 |
| 2014/0019882 A1* | 1/2014 | Chew | G06Q 10/10 715/753 |
| 2014/0063174 A1* | 3/2014 | Junuzovic | G06Q 10/101 348/E7.083 |
| 2014/0195899 A1* | 7/2014 | Bastide | G06F 40/166 715/256 |
| 2015/0116448 A1* | 4/2015 | Gottlieb | H04N 21/47205 348/14.03 |
| 2015/0248167 A1* | 9/2015 | Turbell | G06F 3/0481 715/754 |
| 2016/0073055 A1* | 3/2016 | Marsh | H04N 7/152 348/14.08 |
| 2016/0094354 A1* | 3/2016 | Zhao | H04N 7/152 709/205 |
| 2018/0011627 A1* | 1/2018 | Siracusano, Jr. | G06F 3/04845 |
| 2018/0376104 A1* | 12/2018 | Li | G06F 40/169 |
| 2019/0007469 A1* | 1/2019 | Sanso | H04L 67/02 |
| 2019/0342522 A1* | 11/2019 | Garrido | H04M 1/72439 |
| 2019/0379712 A1* | 12/2019 | Mota | H04L 65/1089 |
| 2020/0104024 A1* | 4/2020 | Baba | H04N 7/152 |
| 2020/0106813 A1* | 4/2020 | Vendrow | H04L 65/4015 |
| 2020/0252553 A1* | 8/2020 | Luo | H04N 5/265 |
| 2022/0086238 A1* | 3/2022 | Oh | H04L 67/142 |
| 2022/0124382 A1* | 4/2022 | Somlai-Fischer | H04N 7/15 |
| 2022/0247940 A1* | 8/2022 | Springer | H04N 21/2187 |

* cited by examiner

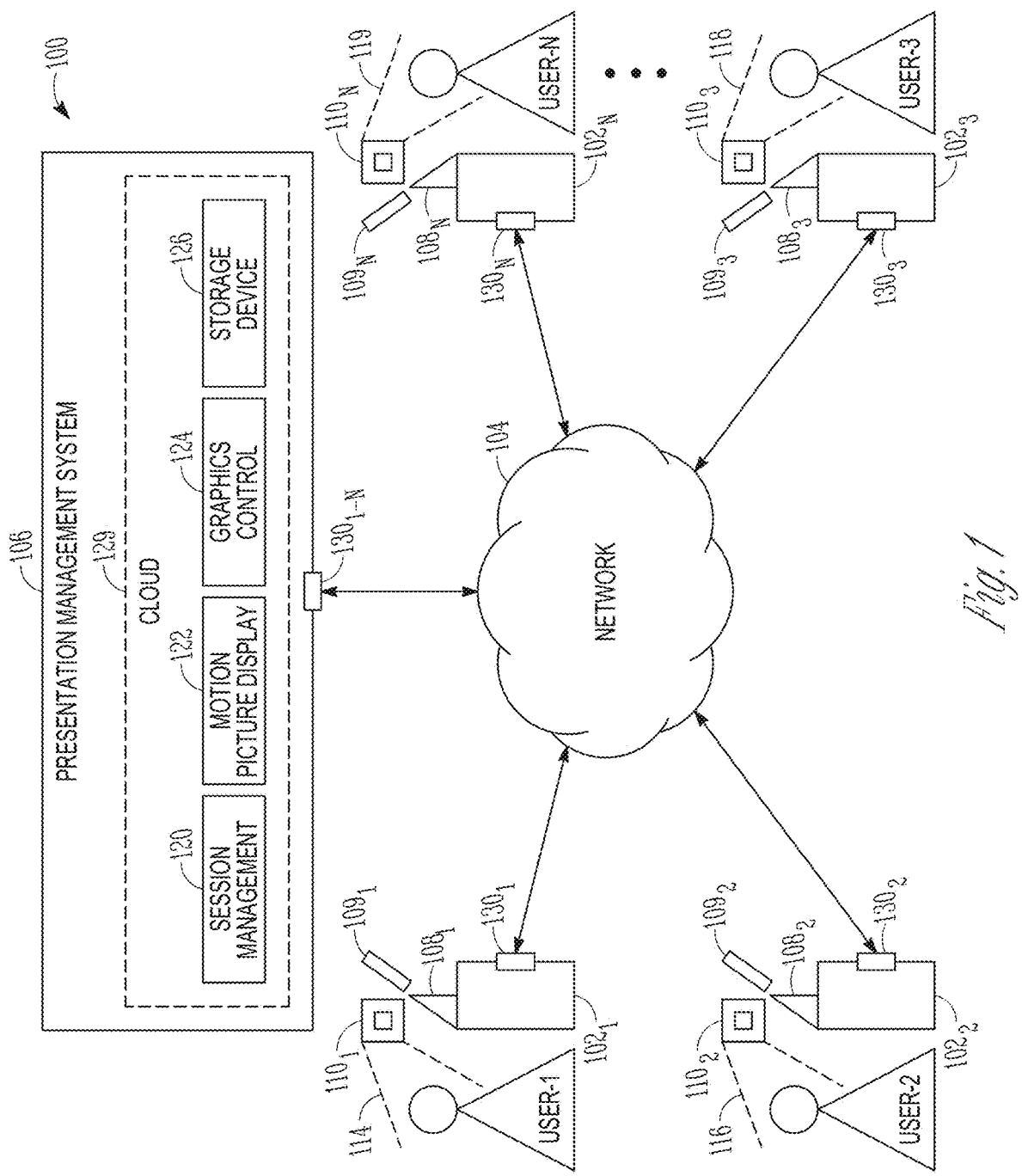

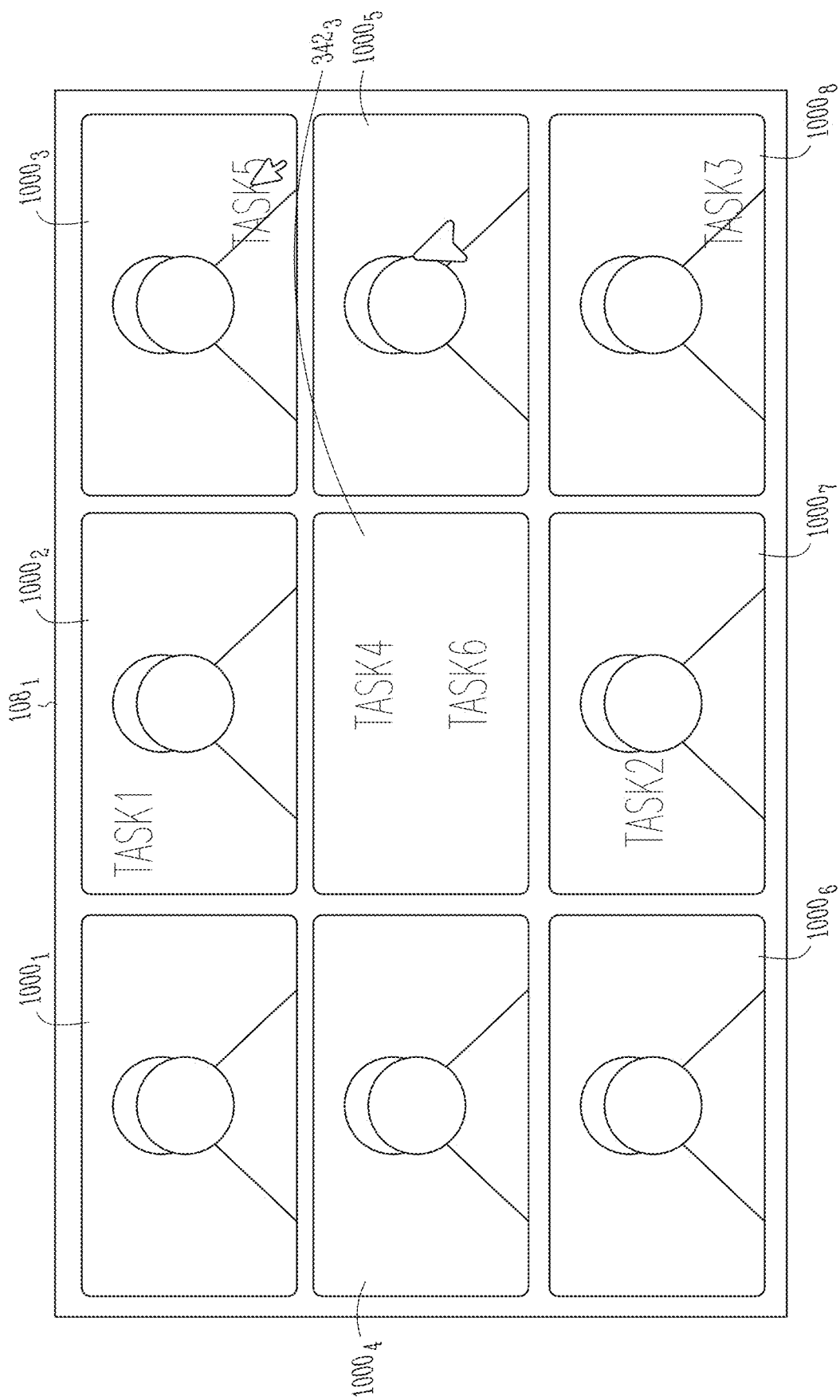

RELOCATION OF CONTENT ITEM TO MOTION PICTURE SEQUENCES AT MULTIPLE DEVICES

CROSS-REFERENCE TO RELATED APPLICATION

This application claims priority to U.S. provisional application Ser. No. 63/220,098, filed Jul. 9, 2021, entitled Relocation of Content Item from Slide to Motion Picture Sequence at Multiple Devices, which is incorporated herein in its entirety by this reference.

BACKGROUND

Online virtual meetings permit users to interact with one another in real time while located at separate places using their computing devices. Multiple users can view and speak with one another in real time during an online meeting. Content presentation material such as slide presentations that include content items such as pictures, text and video clips can be displayed in real-time while users view and speak with one another online. Users can collaborate in creation and editing content items, such as documents, while viewing and speaking to one another online. Tus, users can discuss and create content items online. However, there remains a need for improvement in the use of content items to facilitate online communication. The present invention meets this need.

SUMMARY

The present disclosure generally relates to machines configured to manage display of motion picture image sequences (MPISs) at multiple computing devices over a network, including computerized variants of such special-purpose machines and improvements to such variants, and to the technologies by which such special-purpose machines become improved compared to other special-purpose machines that provide technology for processing radar data and image data. In particular, the present disclosure addresses systems and methods for managing distribution of content items to within MPISs displayed at each of one or more multiple computer devices and to methods of relocating content items between MPISs display at each of multiple computing devices. The distribution of content items between one or more MPIS improve activities such as, pinning memorable parts of a presentation, task assignment, collaborative plan building, and real-time polling, to name a few examples.

According to some aspects of the technology described herein, an electronic presentation system includes one or more computer processors operatively coupled to one or more computer memories storing instructions executable by the one or more computer processors to configure the one or more computer processors to perform operations. The operations include, causing display of a MPIS captured at a first computing device, within image display regions of display screens at multiple computing devices. The operations include, causing display of first multiple content items, on the display screens of the multiple computing devices, separate from the MPIS. The operations include, based at least in part upon receiving at the presentation management system from the first computing device, first relocation information indicating a first content item, from the first multiple content items, causing relocation of display of the of the first content item, to within the respective image display regions at the multiple computing devices.

According to some aspects of the technology described herein, an electronic presentation system includes one or more computer processors operatively coupled to one or more computer memories storing instructions executable by the one or more computer processors to configure the one or more computer processors to perform operations. The operations include, causing display of separate MPISs captured at different ones of multiple computing devices, within separate image display regions of display screens at the multiple computing devices. The operations include, causing display of multiple content items on the display screens of the multiple computing devices. The operations include, based at least in part upon receiving at the presentation management system from a first one of the multiple computing devices, first relocation information indicating a first content item, from the multiple content items, and one of the image display regions, causing relocation of display of the of the first content item, at each of the multiple computing devices, to within the respective image display region indicated in the first relocation information. The operations include, based at least in part upon receiving at the presentation management system from a second one of the multiple computing devices, second relocation information indicating a second content item, from the multiple content items, and one of the image display regions, causing relocation of display of the of the second content item, at each of the multiple computing devices, to within the respective image display region indicated in the second relocation information.

According to some aspects of the technology described herein, an electronic presentation system includes one or more computer processors operatively coupled to one or more computer memories storing instructions executable by the one or more computer processors to configure the one or more computer processors to perform operations. The operations include, causing display of the two or more MPISs within two or more corresponding image display regions of display screens at each of two or more computing devices. The operations include, causing display of multiple content items on the display screens of the two or more computing devices, separate from the MPISs. The operation include, based at least in part upon receiving at presentation management system from a first one of the at least two or more computing devices, first relocation information indicating a first content item, from the multiple content items, and one of the two or more image display regions, causing relocation of display of the of the first content item, at each of the two or more computing devices, to within the respective image display region indicated in the first relocation information. The operations include, based at least in part upon receiving at presentation management system from a second one of the at least two or more computing devices, second relocation information indicating a second content item, from the multiple content items, and one of the two or more image display regions, causing relocation of display of the of the second content item, at each of the two or more computing devices, to within the respective image display region indicated in the second relocation information.

According to some aspects of the technology described herein, an electronic presentation system includes one or more computer processors operatively coupled to one or more computer memories storing instructions executable by the one or more computer processors to configure the one or more computer processors to perform operations. The operations include, causing display of the two or more motion picture image sequences (MPISs) within two or more corresponding image display regions of display screens at each of two or more computing devices. The operations include, causing display of a content item within the first MPIS displayed at each of the two or more computing devices, based at least in part upon recognizing a first-occurring user gesture within the first MPIS. The operations include, causing relocation of display of a content item to within the second MPIS displayed at each of the two or more computing devices, based at least in part upon recognizing second-occurring user gesture within the second MPIS while the content item is displayed within the first MPIS at each of the two or more computing devices.

BRIEF DESCRIPTION OF THE DRAWINGS

Some embodiments are illustrated by way of example and not limitation in the figures of the accompanying drawings. In the drawings, which are not necessarily drawn to scale, like numerals may describe similar components in different views. Like numerals having different letter suffixes may represent different instances of similar components.

FIG. 1 is a diagram illustrating presentation system suitable for providing a collaborative presentation over a computer network, according to some example embodiments.

FIGS. 10A-10B represent an illustrative example third sequence of screen display images presented at a plurality of devices of the presentation system of FIG. 1 based upon the first method of FIG. 3.

DETAILED DESCRIPTION

Overview

Figures 2A, 2B:
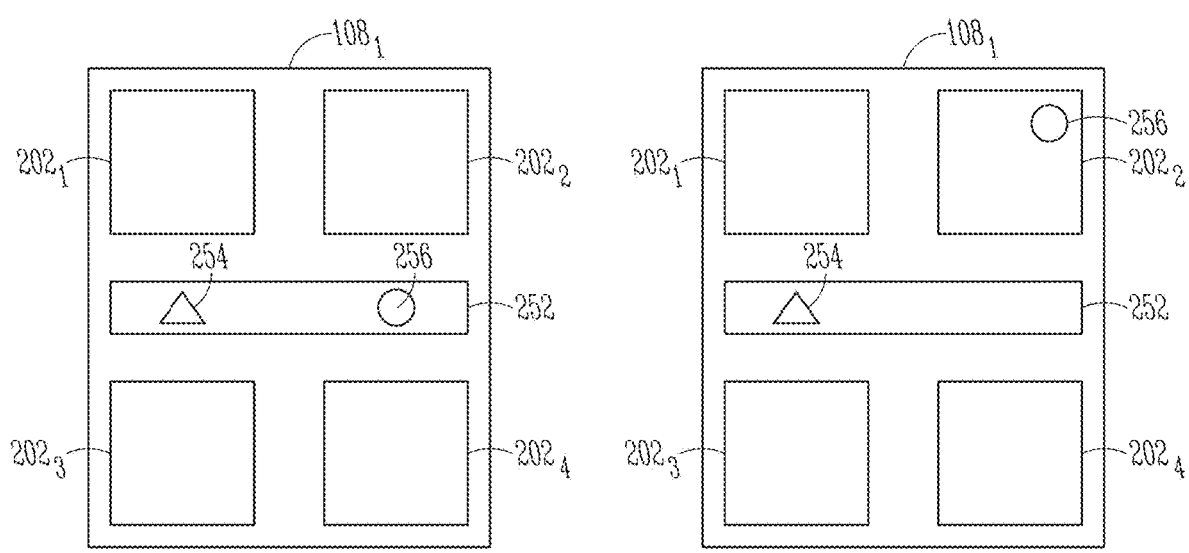
FIG. 2A is an illustrative drawing showing an example screen display displaying multiple motion picture image display regions and a slide containing first and second content elements.
FIG. 2B is an illustrative drawing showing the example screen display of FIG. 2A except that the second content item is relocated from the slide to the second motion picture image display region.

In an example embodiment, a real-time motion picture image sequence (MPIS) is displayed simultaneously with an electronic slide on multiple device display screens. The slide includes multiple content items. Relocation of an individual content item from the slide to a location overlaying a portion of the MPIS is displayed on multiple device display screens.

In an example embodiment, a relocated content item is pinned to the display screen so as to continue to be displayed separate from the individual slide from which it was relocated, even after that slide has been removed and/or supplanted by a next slide in a slide presentation. The MPIS and the relocated, pinned content item are displayed on multiple device display screens.

In an example embodiment, a different MPISs are captured, each at a different one of multiple computing devices. The multiple MPISs are displayed on display screens of the multiple devices. A user of a first device causes a content item to be displayed overlaying a portion of a first MPIS captured at the first device. An image of the content item overlaying the portion of a first MPIS is displayed at each of the multiple content items. A user of a second computing device uses one or more gestures to relocate the content item from the location overlaying the portion of the first MPIS to a location overlaying a portion of a second MPIS captured at the second device. An image of the content item relocated to overlay the portion of a second MPIS is displayed at each of the multiple content items.

Presentation System

FIG. 1 is a diagram illustrating a presentation system 100 suitable for providing a collaborative presentation over a computer network, according to some example embodiments. The presentation system 100 includes that includes n devices $102_1$-$102_n$ communicatively coupled over a network 104 to a real-time network-based presentation management system 106 to conduct a collaborative presentation. As used herein, real-time refers to a response within milliseconds or microseconds, such as a response that is guaranteed by a specified deadline relative to an event. Thus, for example, a real-time network-based presentation management system returns results without significant delay and sufficiently quickly to affect the environment at that time. As an example, a device may be a desktop computer, a vehicle computer, a tablet computer, a navigational device, a portable media device, a smart phone, or a wearable device (e.g., a smart watch, smart glasses, smart clothing, or smart jewelry) belonging to the user. A first device $102_1$ comprises a screen display $108_1$, a first input device $109_1$ to receive first user input, and a first image capture device $110_1$ to capture a motion picture image sequence of a first of a first physical scene 114 that can include a first user (user-1) during a collaborative presentation. Similarly, a second device $102_2$ comprises a second screen display $108_2$, a second input device 1092 to receive second user input, and a second image capture device $110_2$ to capture a motion picture image sequence of a second physical scene 116 that can include a second user (user-2) during the collaborative presentation. A third device $102_3$ comprises a third screen display $108_3$, a third input device $109_3$ to receive third user input, and a third image capture device $110_3$ to a capture motion picture image sequence of a third physical scene 118 that can include a third user (user-3) during the collaborative presentation. An nth device $102_n$ comprises an nth screen display $108_n$, nth input device $109_n$ to receive nth user input, and an nth image capture device $110_n$ to capture a motion picture image sequence of an nth physical scene 119 that can include an nth user (user-n) during the collaborative presentation. The real-time network-based presentation management system 106 and the devices $102_1$ to $102_n$ each may be implemented in one or more special-purpose (e.g., specialized) machines, in whole or in part, as described below with respect to FIG. 14.

The presentation management system 106 manages a collaborative presentation at communicatively coupled devices $102_1$ to $102_n$. In one example embodiment, the presentation management system 106 comprises a session management machine 120, a motion picture display machine 122, a graphics display engine 124, and a storage device 126. The presentation management system 106 may form all or part of a cloud 129 (e.g., a geographically distributed set of multiple machines configured to function as a single server). As explained more fully below, the presentation management system 106 controls display of motion picture image sequences captured at one or more of the devices $102_1$ to $102_n$ on corresponding screen displays $108_1$ to $108_n$ of each of the devices $102_1$ to $102_n$ and controls the overlay of machine-generated content items on portions of the displayed motion picture images. The presentation management system 106 may comprise other components used to provide presentation operations that are not discussed in detail herein.

The session management machine 120 manages establishing and conducting a collaborative session using the devices $102_1$ to $102_n$. In example embodiments, the session management machine 120 establishes and manages network connections $130_1$-$130_n$ via the network 104 to communicatively couple the devices $102_1$ to $102_n$ to establish a session. In some example cases, session management machine 120 sends an invitation over the network 104 to the devices $102_1$ to $102_n$ to join the presentation. In some example cases, the invitation includes an identifier for the presentation and possibly a password to join. In response to the invitation, the devices $102_1$ to $102_n$ send identification information, such as optional password information, over the network 104 to the session management machine 120. Based on a verification of the identifier information, corresponding devices are joined into the presentation. In an example mode of operation, the session management machine 120 receives a captured motion picture image sequence (e.g., a live motion picture video feed) from one of the devices, e.g., $102_1$. In another example mode of operation, the session management machine 120 receives captured motion picture images from each of the multiple devices $102_1$ to $102_n$ that joins the presentation session.

During a presentation session, the session management machine 120 sends the received one or more motion picture image sequences over the network 104 to the devices $102_1$ to $102_n$, and also sends over the network 104 to the devices $102_1$ to $102_n$, content item presentation and relocation information produced using the graphics display engine 124 explained below. Content item presentation and relocation information can be produced during a presentation session, based at least in part upon user input provided at one or more of input devices $109_1$ to $109_n$ which is communicated over the network 104 by the one or more corresponding devices $102_1$ to $102_n$ to the presentation management system 106. Alternatively, in an example presentation system 100, content item presentation and relocation information can be produced using hand gestures as explained more fully below. During the session, the devices $102_1$ to $102_n$ are configured, using a downloadable application for example, to display, on the screen displays $108_1$ to $108_n$, the motion picture image sequences they receive over the network 104 and to display content items on their corresponding screen displays $108_1$ to $108_n$, based upon presentation and relocation information they receive over the network 104.

During a presentation session, the motion picture display machine 122 organizes motion pictures image sequences that are captured at one or more of the devices $102_1$ to $102_n$ for communication over the network 104, by the session management engine 120, to the devices $102_1$ to $102_n$. In an example presentation system 100, organizing the motion picture image sequences can include associating each motion picture image sequence with a corresponding identifier. In an example motion picture display machine 122, an identifier can identify a device where the sequence is captured. In an example motion picture display machine 122, an identifier can identify a user at a device where the sequence is captured.

As explained below, in an example sole presenter mode, each of the multiple devices $102_1$ to $102_n$ displays motion picture image sequences captured at a designated one of the multiple devices $102_1$ to $102_n$. For example, if device $102_1$ is a presenter device, then during a collaborative presentation session, the motion picture display machine 122 causes provision over the network 104 of a motion picture image sequence captured at device $102_1$ for display at each of devices $102_1$ to $102_n$.

Alternatively, in an example multiple presenter mode, the motion picture display machine 122 causes provision over the network 104 of multiple captured motion picture image sequences captured at multiple corresponding devices, e.g., $102_1$ to $102_n$, for display at each of the multiple devices $102_1$ to $102_n$. Depending upon the number of devices $102_1$ to $102_n$, from which motion picture images are captured, it may not be possible to simultaneously provide on-screen display, at one or more of the devices, of the motion picture images captured at all of the devices $102_1$ to $102_n$. In an example presentation system 100, an individual device that receives multiple motion picture image sequences from the presentation management system 106 can be configured to determine which or how many of the captured motion picture images are displayed at that device at any given moment, based upon a user's input to the device or based upon available screen display space, for example.

The graphics display engine 124 controls display of machine-generated content items displayed on the screen displays $108_1$ to $108_n$ during a presentation session. The content items can visually overlay portions of motion picture image sequences displayed on the screen displays $108_1$ to $108_n$ based upon presentation and relocation command information received during a presentation session. As used herein, the term "content item" refers to a computer/machine generated image that is displayed on a screen display in the course of a presentation and that, therefore, constitutes a part of the presentation. A content item may include content items such as, text, image, graphics, shapes, video, animation, hypertext link, other (nested) content items, or other visual components, for example. As explained more fully below, a content item can include an electronic display slide. As used herein, an electronic display slide, hereinafter referred to as a, "slide", refers to a single page of a presentation that is generated on a computing device display screen. A slide presentation ordinarily includes multiple slides that can be arranged for presentation in sequence. A computing device can be configured using executable instructions to generate slides on a display screen based upon slide data that is electronically stored in a non-transitory computer readable storage device. Collectively, a group of slides that make up a presentation may be referred to as a slide deck. Slides in a presentation typically can be presented individually, one at a time, on a display screen and can be selectively sized to encompass all or a portion of a display screen. As explained more fully below with reference to FIGS. 2A-2B, one of the devices, e.g., device $102_1$, can provide relocation command information, during a presentation, to initiate relocation of a content item from a slide to a portion of a motion picture image display region. The device providing the relocation command information e.g., device $102_1$, sends relocation information over the network 104 to the presentation management system 106 indicating motion picture image region to which to relocate a content item. The graphics display engine 124 can provide relocation command information, based upon the received relocation command information, to indicate the commanded relocation of a content item from a slide to a portion of a motion picture image display region in each of the multiple devices $102_1$ to $102_n$.

In an example presentation system 100, the relocation command information can include an identifier of a motion picture display region to which a content item is commanded to be relocated. In an alternative example presentation system 100, relocation command information to identifies a screen display region to which a content item is commanded to be relocated. In response to relocation command information from a device, e.g., device $102_1$, the session management machine 120 sends information relocation information over the network 104 to the devices $102_1$ to $102_n$ that indicates the commanded relocation.

For example, relocation command information received from device $102_1$ may command relocation of a content item from a slide to a portion of a motion picture display region identified as corresponding to device $102_3$. Moreover, for example screen display $108_2$ of device $102_2$ may include a separate motion picture display region for each of devices $102_1$ to $102_n$. Motion picture display regions are discussed more fully below with reference to FIGS. 2A-2B. Based upon the example relocation command information received from device $102_1$, the graphics display engine 124 may cause relocation of a content item from a slide to a motion picture display region of screen display $108_1$ corresponding to device $102_3$.

In an example environment 100, the devices $102_1$ to $102_n$ are configured, using a downloadable application for example, to send presentation and relocation command information over the network to the presentation management system 106 and to display a relocated content item to overlay a portion of a motion picture image display region, based upon presentation and relocation command information received over the network 104 from the presentation management system 106. More particularly, for example, the graphics display engine 124 can adjust a location of a content item on all of the screen displays $108_1$-$108_n$ based upon presentation and relocation command information received at one of the devices, e.g., device $102_1$ to adjust the position of that content item on the screen display, e.g., $108_1$, of that one device. Example devices $102_1$ to $102_n$ include pointing device (e.g., mouse) to control to receive user input. Alternatively, in accordance with some embodiments, the devices $102_1$-$102_n$ may include user interface gesture sensors (e.g., a part of the image capture devices $110_1$ to $110_n$) responsive to user gestures, such as hand gestures, that may act as a device interface to control interaction with a content item, for example.

The storage device 126 includes a non-transitory computer memory device configured to store presentation information. For example, the presentation information can comprise a presentation identifier for a presentation along with identifiers of users that have accepted an invitation to attend the presentation. The storage device 126 can also store a copy of a downloadable client application that can be provided over the network 104 to the devices $102_1$ to $102_n$ to configure the devices to participate in a presentation.

Still referring to FIG. 1, one or more of the users user-1 to user-n may be a human user (e.g., a human being), a machine user (e.g., a computer configured by a software program to interact with a device, e.g. device $102_1$), or any suitable combination thereof (e.g., a human assisted by a machine or a machine supervised by a human). Individual ones of the devices $102_1$-$102_n$ can include a desktop computer, a vehicle computer, a tablet computer, a navigational device, a portable media device, a smart phone, or a wearable device (e.g., a smart watch, smart glasses, smart clothing, or smart jewelry) belonging to a user.

Any of the devices or machines (e.g., databases and devices) shown in FIG. 1 can be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 14, and such a special-purpose computer accordingly can be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

In various embodiments, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Motion picture image information, content item information, instructions to adjust a screen display location of a content item, and other information used to conduct presentation may be transmitted and received by the devices $102_1$-$102_n$ and the presentation management system 106 over the network 104 using a transmission medium via a network interface device (e.g., a network interface component included in the communication components) and utilizing any one of a number of well-known transfer protocols (e.g., HTTP). Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In some embodiments, the devices $102_1$ to $102_n$ interact with the network 104 and the presentation management system 106 through a client application stored thereon or through a browser. The client application can be downloaded from the storage device, to the devices $102_1$ to $102_n$ to configure the devices to allow for exchange of information with and over the network 104. The client application or browser may also cause presentation of the canvas and manipulation of content items on the canvas. For example, the client application or browser running on one device e.g., device $102_1$, may generate content item presentation and content item relocation commands based upon user input received at a user-controlled input device, e.g., input device $109_1$, to adjust a location of a user-identified content item content item from a location within a slide content item to a user-identified location on a user-identified motion picture image sequence captured at one of the devices, e.g., device $102_2$, which is displayed at each of screen displays $108_1$ to $108_n$. Alternatively, in an example presentation system 100, presentation and relocation information can be produced using hand gestures. Based upon detecting the presentation and/or relocation command, which is communicated over the network 104, the motion picture display machine 122 adjusts display of the user-identified content item on the canvas to cause display of the user-identified content item at the user-identified location of the user-identified motion picture image sequence, which is displayed in the screen displays $108_1$ to $108_n$.

Relocation of Content Items from Slide to MPISs

FIG. 2A is an illustrative drawing showing an example screen display $108_1$ displaying multiple motion picture image display regions $202_1$ to $202_4$ and a slide 252 containing first and second content elements 254, 256. In this example, only motion picture sequences captured at four example devices $102_1$ to $102_4$ are displayed at the screen display $108_1$. Each motion picture image display region $202_1$ to $202_4$, displays a different motion picture image sequence captured at a different one of devices $102_1$ to $102_4$. In the example display shown on the screen display $108_1$ of FIG. 2A, a first motion picture image display region $202_1$ displays motion picture image sequence (not shown) captured at the first device $102_1$. A second motion picture image display region $202_2$ displays motion picture image sequence (not shown) captured at the second device $102_2$. A third motion picture image display region $202_3$ displays motion picture image sequence (not shown) captured at the device $102_3$. A fourth motion picture image display region $202_4$ displays motion picture image sequence (not shown) captured at a fourth device $102_4$.

FIG. 2B is an illustrative drawing showing the example screen display of FIG. 2A except that the second content item 256 is relocated from the slide 252 to the second motion picture image display region $202_2$. As will be explained more fully below, in an example presentation system 100, relocation of the second content item 256 from the slide 252 (FIG. 2A) to a portion of the second motion picture image display region $202_2$ (FIG. 2B) involves one of devices $102_1$ to $102_4$ imparting a relocation command information to cause relocation of the second content item 256 within the display $108_1$, from a location within the slide 252 to a location within the second motion picture image display region $202_2$ so that the second content item visually overlays a portion of the motion picture image sequence displayed in that second region $202_2$.

Figure 3:
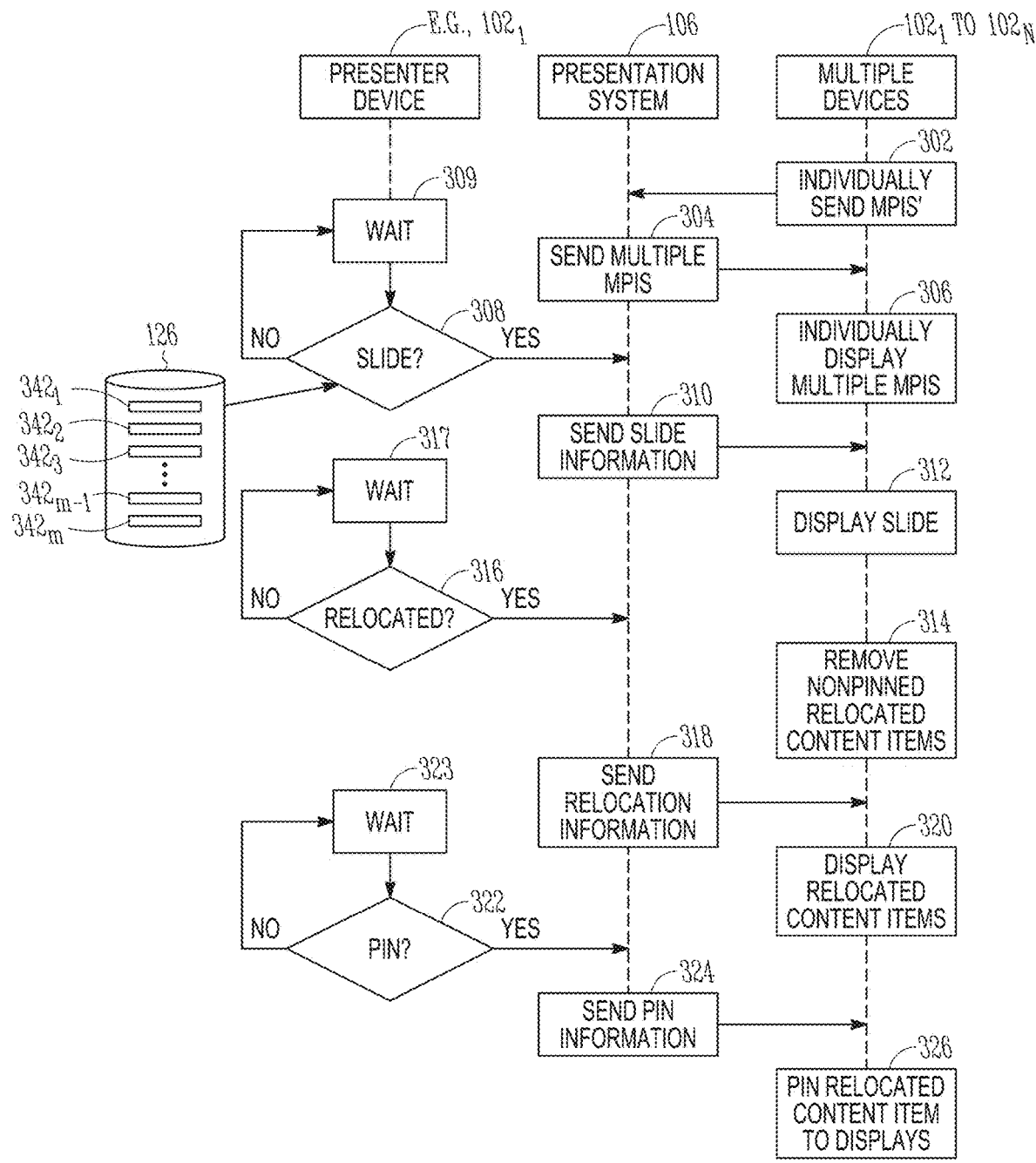
FIG. 3 is an illustrative first sequence flow diagram representing an example first method to cause display of motion picture image sequences, content slides, and content items at multiple devices.

FIG. 3 is an illustrative sequence flow diagram representing an example first method 300 for displaying motion picture image sequences, content slides, and content items at multiple devices $102_1$ to $102_n$ of the system of FIG. 1. One or more processor circuits of the presentation management system 106 and one or more processor circuits of each of devices, e.g., $102_1$ to $102_n$, are specially configured according to computer executable code to implement the operations of the first method 300. Slide selection operation 308, relocation operation 316, and pin operation 322 represent event operations that can be initiated by user input at a presenter device. The relocation operation 316 and the pin operation 322 represent unconventional uses of a computing device in display of electronic display slides. More specifically in relocation operation 316 a computing device e.g., $102_1$ causes a slide to be taken apart during a presentation by relocating content items from the slide to regions of a display screen where an MPIS is displayed. Thus, rather than causing a slide to be presented as a single page/unit, through operation 316, the computing device causes the slide to be displayed in separate parts i.e., with some or all content items displayed separately from the slide. In the pin operation 322, a computing device e.g., $102_1$ causes a relocated content item to be persistently displayed on a display screen even after the slide from which it is relocated disappears from display or a next slide is displayed. Thus, rather than presenting slides in sequence one after the other, operation 322 causes constituents of a slide i.e., its relocated content items, to persist and be presented in conjunction with subsequently displayed slides.

As explained more fully below, in an example presentation system 100, different devices can act as a presenter device at different times. In an example presentation system 100, operations 304, 310, 318, and 324 are performed at the presentation system 106. In an example presentation system 100, operations 302, 306, 312, 314, 320, 326 are performed at individual devices $102_1$-$102_n$. Moreover, activation of different event operations triggers different sequences of operations at the presentation system 100 and at the individual user devices $102_1$-$102_n$. an activation of a slide selection operation 308 triggers operations 310, 312, and 314. Activation of a relocation operation triggers operations 318 and 320. Activation of pin operation triggers operations 320 and 324.

At operation 302, each of one or more of multiple individual devices, e.g., devices $102_1$ to $102_n$, sends over the network 104 to the presentation management system 106, a motion picture image sequence (MPIS) captured at the device. The sending operation 302 involves each device streaming an MPIS captured at the device over the network 104 to the presentation management system 106, throughout the first process 300. It is contemplated that streaming will include video content streaming. At operation 304, the presentation management system 106 receives the one or more MPISs from each of the multiple individual devices and sends over the network 104 to multiple devices, e.g., $102_1$ to $102_n$, the one or more received motion picture image sequences to cause display of the one or more MPISs at the multiple devices. Operation 306 causes each of the multiple devices, e.g., $102_1$ to $102_n$, to display on its display screen, e.g., $108_1$ to $108_n$, the one or more motion picture image sequences sent over the network by the presentation management system 106. In an example system 100, the individual devices $102_1$ to $102_n$ may display fewer than all the motion picture image sequences at any given moment, depending upon available screen area.

A slide selection operation 308 is active in response to user input received at a presenter device, e.g., device $102_1$, e.g., via input device $109_1$, indicating a user-initiated slide selection event in which a slide is selected from a storage device 340 for display. The example machine-readable storage device 126 at the presentation management system 106 stores multiple selectable slides $342_1$-$342_m$. As explained below, example slides $342_1$-$342_m$ can be logically organized for sequential presentation. In response to user input received at a presenter device, operation 308 causes the presenter device to send slide selection information over the network 104 to the presentation management system 106. The slide selection operation 308 is in a wait state 309 while awaiting user activation input. Moreover, slide selection operation 308 can be active multiple times during a presentation as one or more users select new slides for presentation at different times during the presentation. As used herein a "presenter device" is a device that is configured to provide input to cause presentation of one or more content items on one or more display screens during a presentation. In an example presentation system 100, any one of devices $102_1$ to $102_n$ can act as a presenter device and a selection of which of the devices is designated can be changed throughout a presentation. It is contemplated that in an example system 100, the presentation management system 106 sends information to the computing devices $102_1$ to $102_n$ indicating which of the dives is act as the presenter device. The presentation management 106 can change the which computed device is the presenter device. Moreover, it is contemplated in an example system 100, the individual computing devices can send requests to the presentation management 106 to act as (or to not act as) the presenter device. Moreover, there can be more than one presenter device at any given time. At operation 310, the presentation management system 106 sends over the network 104 to the multiple devices, e.g., $102_1$ to $102_n$, information to cause display of the selected slide. The selected slide includes one or more user-selectable content items. At operation 312, the multiple devices, e.g., $102_1$ to $102_n$, display on their screen displays the selected slide that includes one or more user-selectable selectable content items. At operation 314, the multiple devices remove from their screen displays, display of previously relocated content items that are not pinned.

At relocation operation 316, a relocator device, e.g., device $102_3$, receives input from an input device, e.g., input device $109_3$, indicating a user-initiated relocation command information that requests relocation of a content item from a currently displayed slide to a portion of a motion picture image display region displayed on the screen display, e.g., $108_3$, of the device. As used herein a "relocator device" is a device that is configured to cause relocation of display of a content item currently presented at an MPIS to a different MPIS. Relocation operation 316 is active in response to user input received from an input device. Relocation operation 316 is in a wait state 317 while awaiting such input. Moreover, relocation operation 316 can be active multiple times during a presentation as one or more users relocate different content items from one or more different slides at different times during the presentation. It is noted that the relocator device requesting relocation of a content item from a slide can be different from the presenter device that selected the slide for presentation. The device requesting content relocation, e.g., device $102_3$, receives relocation command information input from an input device, e.g., input device $109_3$, that identifies a content item within a currently displayed slide and that identifies motion picture image display region to which the content item is to be relocated. The device requesting content relocation, e.g., device $102_3$, also receives input from an input device, e.g., input device $109_3$, that identifies a location, e.g., a two-dimensional (x, y) portion within the identified region in which to display the relocated content item. Also, at relocation operation 316, the relocator device sends relocation command information that can identify the content item, the target relocation region and a target portion within the target region over the network to the presentation management system 106. At operation 318, the presentation management system 106 sends over the network 104 to the multiple devices, e.g., $102_1$ to $102_n$, information to cause display of the identified content item from the currently selected slide to the identified portion of the identified display region. At operation 320, the multiple devices, e.g., $102_1$ to $102_n$, display on their screen displays the identified content item relocated from the currently selected slide to the identified portion of the identified display region.

At pin operation 322, a designated device, e.g., device $102_n$, receives input from an input device, e.g., input device $109_n$, indicating a user-initiated pin event to "pin" a relocated content item to a display so that it continues to be displayed on screen displays e.g., $102_1$ to $102_n$, even after a different slide, different from the slide from which the content item was relocated, is selected and displayed. Pin operation 322 is active (the "yes" branch) in response to user input received from an input device. Pin operation 322 is in a wait state 323 while awaiting such input. Moreover, pin operation 322 can be active multiple times during a presentation as one or more users pin different relocated content items at different times during a presentation. Also, at pin operation 322, at least one of the presenter device and the relocator device sends information identifying the pinned content item over the network 104 to the presentation management system 106. At operation 324, the presentation management system 106 sends over the network 104 to the multiple devices, e.g., $102_1$ to $102_n$, information identifying the pinned relocated content item. At operation 326, the multiple devices designated the pinned content item for keeping on-screen even after a slide different from the slide from which the content item was relocated, is selected and displayed. In an example system 100, the presentation management system 106 delays performance of operation 324 until a next occurrence of a slide selection operation 308 causes a change of displayed slide.

Figure 4:
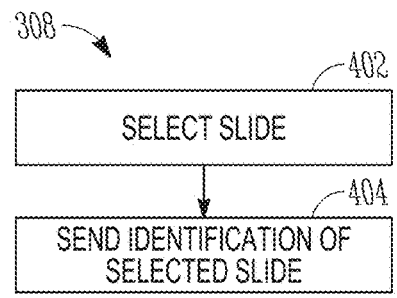
FIG. 4 is an illustrative flowchart representing the device-initiated slide selection operation.
Figure 5:
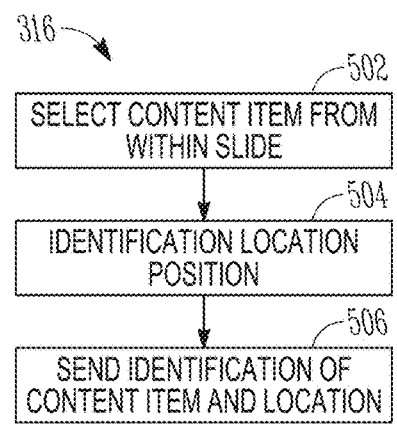
FIG. 5 is an illustrative flow diagram representing the device-initiated content item relocation command information operation.

FIG. 4 is an illustrative flowchart representing the device-initiated slide selection operation 308. At operation 402, a device, e.g., device $102_1$ receives input from its input device $109_1$ selecting a next slide for display. In an example presentation system 100, one or more of multiple devices is configured with menu (not shown) providing a selection of multiple slides that can be selected during operation 402. At operation 404, the device sends information identifying the selected slide over the network to the presentation management system 106. FIG. 5 is an illustrative flow diagram representing the device-initiated relocation operation 316. At operation 502, a device, e.g., device $102_1$ receives input from its input device $109_1$ identifying a content item within a currently selected slide. At operation 504, the device receives input from its input device to identifying a target motion picture image display region and identifies a portion of the region (e.g., a two-dimensional (x, y) region) to which to relocate the content item. In an example device, operation 502 can involve a user-controlled copy operation, and operation 504 can involve a user-controlled paste action. In an alternative example device, operations 502, 504 can involve a click and drag operation. At operation 506, the device sends information, identifying the identified content item, identifying the target display region and the identifying the portion of the target display region, over the network to the presentation management system 106.

Figure 6:
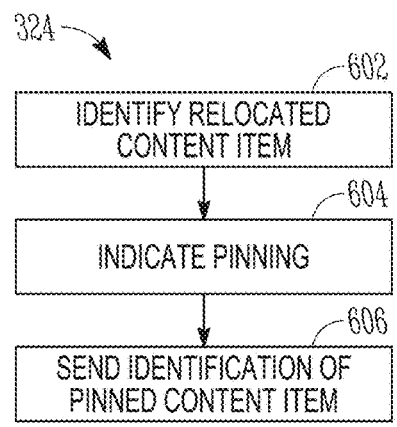
FIG. 6 is an illustrative flowchart representing the device-initiated pin operation.

FIG. 6 is an illustrative flowchart representing the device-initiated pin operation 324. At operation 602, a device, e.g., device $102_1$ receives input from its input device $109_1$ identifying a relocated content item. At operation 604, the device receives input from its input device $109_1$ instructing that the identified relocated content item is to be pinned so that it continues to be displayed even after display of a slide from which it is relocated is replaced with display of a different slide. At operation 606, the device sends information identifying the pinned content item over the network to the presentation management system 106.

Figure 7:
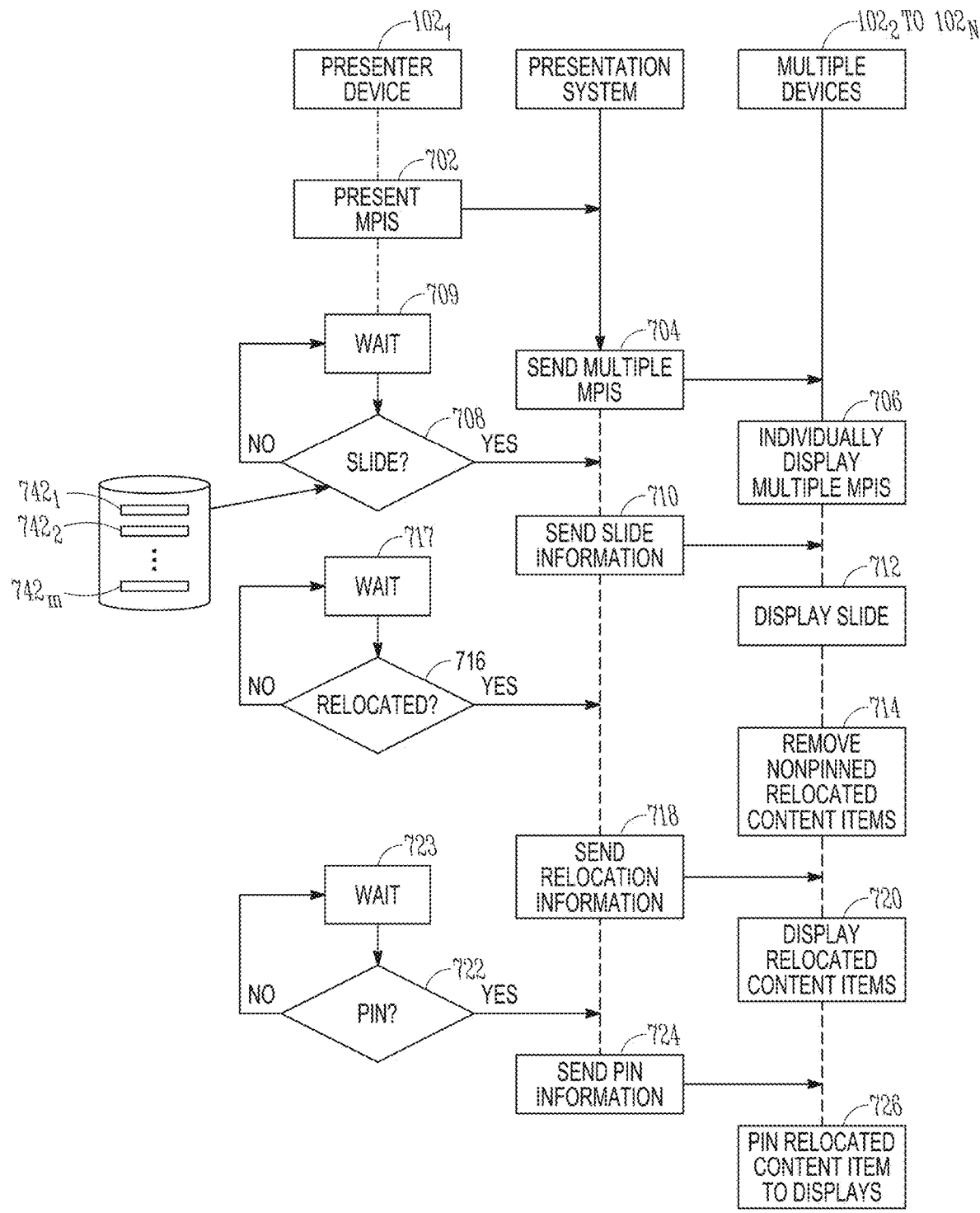
FIG. 7 is an illustrative second sequence flow diagram representing an example second method to cause display of motion picture image sequences, content slides, and content items at multiple devices.

FIG. 7 is an illustrative sequence flow diagram representing an example second method 700 to cause display of motion picture image sequences, content slides, and content items at multiple devices. The illustrative example second method 700 involves a single device acting as a presenter device and as the relocator device. An MPIS captured at the single presenter device is displayed at the display screens of multiple devices. More particularly in a first sequence of screen display images explained with reference to FIGS. 8A-8E, the first device $102_1$ acts as the presenter device used to cause display of a first MPIS $802_1$ captured at the first device $102_1$ to be displayed at the display screen $108_1$ of the first device $102_1$ and at the display screens $108_2$-$108_n$ of the devices $102_2$-$102_n$. One or more processor circuits of the presentation management system 106 and one or more processor circuits of each of devices, e.g., $102_1$ to $102_n$, are specially configured according to computer executable code to implement the operations of the second method 700.

Referring to FIG. 3 and to FIG. 7, it will be appreciated that several individual operations of the first and second methods 300, 700 are the same. However, in the first method 300 shown in FIG. 3, a motion picture image sequences (MPIS) is captured at each of devices $102_1$-$102_n$ and is distributed for display at all of the other device. In contrast, in the second method shown in FIG. 7, only a first MPIS $802_1$ captured at the first device $102_1$ is distributed among devices $102_1$-$102_n$. For efficiency and economy of disclosure, operations in the second method 700 that are the same as operations in the first method 300 will not be explained again in detail.

FIGS. 8A-8E represent an illustrative example first sequence of screen display images caused at multiple devices $102_2$-$102n$ of the presentation system 100 of FIG. 1 by an example single device $102_1$ that acts as a presenter device and a relocator device, based upon the second method 700 of FIG. 7. For efficiency of explanation and drawings, only the display screen $108_1$ is shown, in FIGS. 8A-8E. although it will be understood that the same or similar images are displayed at display screens $108_2$-$108n$, which are not shown.

Referring to FIG. 7, at operation 702, the first device $102_1$ sends the first MPIS $802_1$, captured at the first device $102_1$. The sending operation involves the first device $102_1$ streaming the first MPIS $802_1$ over the network to the presentation manager 106. Throughout the second process 700. At operation 304, the presentation management system 106 receives the first MPIS $802_1$ and sends the first MPIS 802 over the network 104 to multiple devices, e.g., $102_2$ to $102_n$, to cause the display of them to display the first MPIS at their display screens $108_1$-$108n$. At operation 706, each of the multiple devices, e.g., $102_1$ to $102_n$, displays the first MPIS $802_1$ on its display screen $108_1$ to $108_n$.

Referring to FIGS. 8A-8E, there is shown a representation of the display screen $108_1$ of the first device $102_1$ acting as the designated presenting device, which displays the first MPIS $802_1$ captured at the first device $102_1$. The first MPIS $802_1$ also is displayed at the display screens $108_2$-$108_n$, which for efficiency and economy of disclosure and to avoid overcomplicating the drawings, are not shown. It will be understood that for efficiency and economy of disclosure, the illustrative example first MPIS $802_1$ appears to portray a static scene. However, an actual first MPIS $802_1$ includes a live video feed that portray one or more objects in motion, e.g., an image of an individual person, captured and displayed in the first MPIS $802_1$.

Figure 8A:
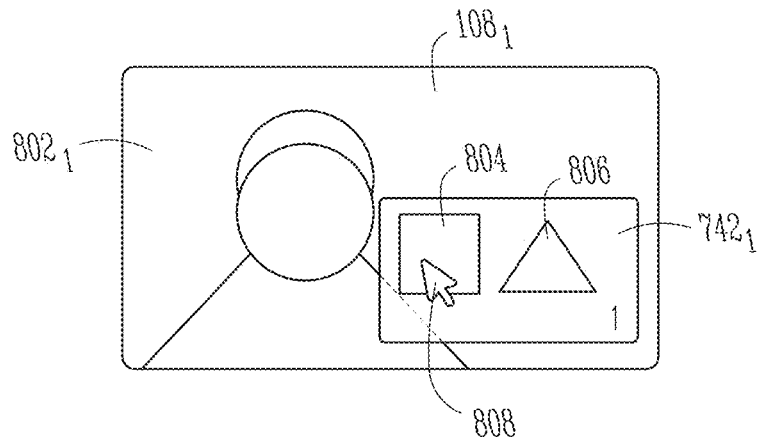
FIGS. 8A-8E represent an illustrative example first sequence of screen display images presented at multiple devices of the presentation system of FIG. 1 caused by a single presenter device based upon the second method of FIG. 7.

The screen image of FIG. 8A shows display of a first slide $742_1$ caused by a first activation of a slide selection operation 708. Referring again to FIG. 7, at a first occurrence of slide selection operation 708, the first device $102_1$ receives input from the first input device $109_1$ indicating a user-initiated slide selection event in which an example first slide e.g., $742_1$ is selected from within the storage device 126 for display. Decision operation is in a wait state 709 while awaiting such input. Activation of the first occurrence of slide selection operation 708 causes the first device $102_1$ to send information indicating the selection of the first slide, e.g., $742_1$, over the network 104 to the presentation management system 106. Operation 710 causes the presentation management system 106 to send over the network 104 to the multiple devices, e.g., $102_1$ to $102_n$, information to cause display of the selected first slide $742_1$. Operation 712 at the multiple devices, e.g., $102_1$ to $102_n$, causes them to display on their screen displays $108_1$-$108_n$ the first slide $742_1$ that includes a first content item 804 and a second content item 806. It is noted that operation 714 is not activated in this first occurrence of slide selection operation since in this example, no slide was displayed before the first slide $742_1$, which is the first slide in the example slide sequence. The example first slide $742_1$ is displayed on the display screens $108_1$-$108n$ throughout a sequence of user actions represented in FIGS. 8A-8F involving example relocation of the first and second content items 804, 806.

Figure 8B:
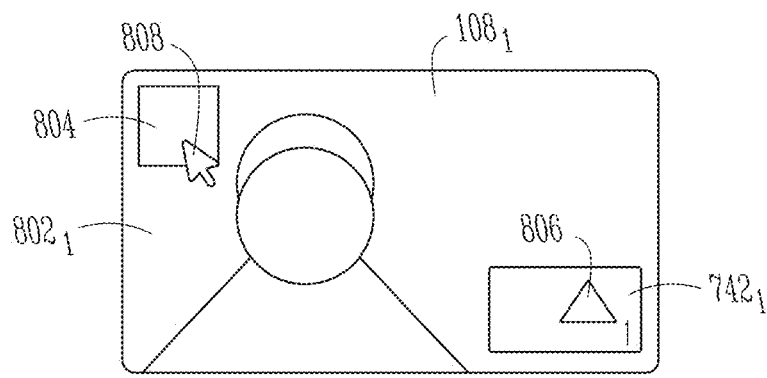

The screen image of FIG. 8B shows relocation of the first content item 904 from the first slide $742_1$ to a portion of the first display screen $108_1$ that displays the first MPIS$_1$. A first occurrence of user activation and control of the relocation operation 716 causes the relocation of the first content item 804. More specifically, at a first activation of relocation operation 716, the first device $102_1$, receives input from the first input device $109_1$, indicating a user-initiated relocation command information that requests relocation of the first content item 804 from the first slide $742_1$ to a user-identified portion of the first screen $108_1$ in which the first MPIS $802_1$ is displayed, causing the relocated first content item 804 to overlay a portion of the first MPIS $802_1$. The relocation operation 716 sends information to the presentation management system 106 indicating the relocation of the first content item 804. The relocation operation is a wait state 717 between activations. The presentation management system 106 receives the information indicating relocation of the first content item 804 and sends over the network 104 to the multiple devices, e.g., $102_1$ to $102_n$, information to cause display of the first content item 804 at corresponding portions of the display screens $108_1$-$108_n$ in which the first MPIS 802 is displayed. At operation 720, the multiple devices $102_1$ to $102_n$, display on their screen displays $108_1$-$108_n$ the example first content item 804 relocated from the first slide $742_1$ to corresponding portions of the display screens $108_1$-$108_n$ indicated by the user at the first device $102_1$ acting as a relocator device. The multiple devices $102_1$ to $102_n$, display on their screen displays $108_1$-$108_n$ the first slide containing only the second content item 806 with the first content item 804 being absent.

The screen images of FIGS. 8A-8B show changes in images presented on the first display screen $108_1$ screen caused by user-controlled first activation of the relocation operation 716. The first content item 804 from the first slide $742_1$ is relocated to a first user-identified region of the first display screen $108_1$ in which the first MIPS $802_1$ is displayed and to corresponding regions in the other display screens $108_2$-$108_n$ in which the first MIPS $802_1$ is displayed. It is contemplated that an example first device $102_1$ includes a click and drag user interface mechanism to select a content item and to identify a location of the display screen to which to relocate a content item. Referring to FIG. 8A, it is contemplated that a user can use the first input device $109_1$ to cause a cursor 808 to hover over the first content item 804 to select the first content item, and then, as shown in FIG. 8B, can drag the selected content item 804 to a user-identified location of the display screen $108_1$ displaying the first MPIS $802_1$. Operations 718-720 causes similar relocation of the first content item 804 in each of the display screens $108_2$-$108_n$.

Figure 8C:
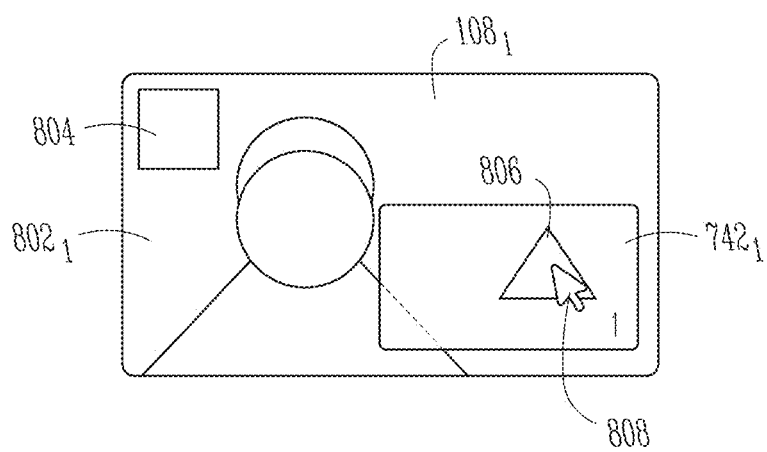
Figure 8D:
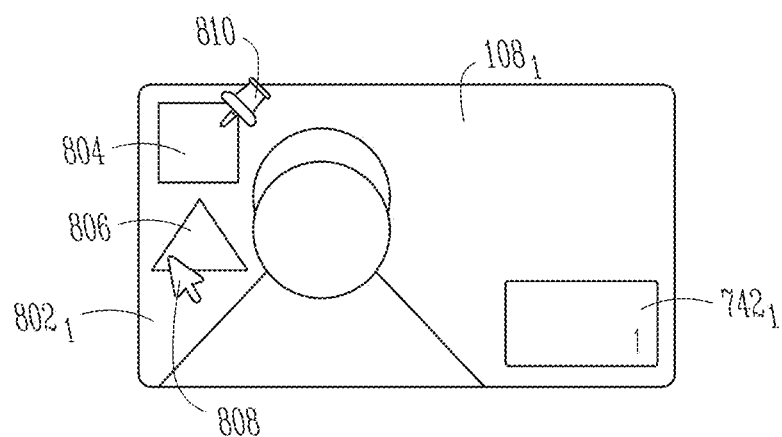

The screen images of FIGS. 8C-8D show changes in images presented on the first display screen $108_1$ caused by user-controlled second activation of the relocation operation 716. The second content item 806 from the first slide $742_1$ is relocated to a second user-identified region of the first display screen $108_1$, in which the first MIPS $802_1$ is displayed and to corresponding regions in the other display screens $108_2$-$108_n$ in which the first MIPS $802_1$ is displayed. Specifics of the second occurrence of operations 716-720 and the relocation of the second content item 806 will be understood from the above explanation of the first occurrence of operations 716-720 and the relocation of the first content item 804, and therefore, for conciseness of explanation, will not be explained in detail.

FIG. 8D shows both the first and second content items 804, 806 relocated from the first slide $742_1$ to portions of the display screen $108_1$ displaying the first MPIS $802_1$. The first and second content items 804, 806 are similarly relocated within the display screens $108_2$-$108_n$. The multiple devices $102_1$ to $102_n$, display on their screen displays $108_1$-$108_n$ the first slide $742_1$ with the first and second content items 804, 806 being absent.

Figure 8E:
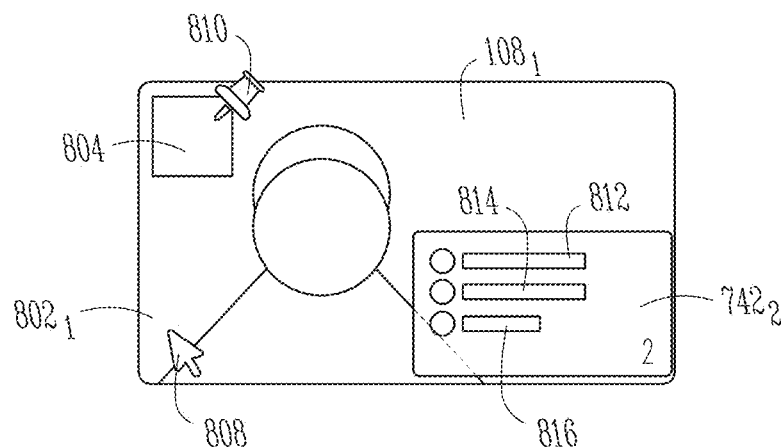

The screen image of FIG. 8E show changes in the image presented on the first display screen $108_1$ caused by a user-controlled activation of a pin operation 722. A pin icon is similarly displayed on display screens $108_2$-$108_n$. An example pin icon 810 is shown overlaying a portion of the relocated first content item 804. The pin icon 810 provides a visual indication to users that the image of the relocated first content item 804 is to persist on the display screen 1081 even after the first slide $742_1$ from which it was relocated is replaced by a different slide that may contain different content items.

Referring to FIG. 7, at activation of the pin operation 722, the first device $102_1$, receives input from the first input device $109_1$, to cause a pin event to "pin" the relocated first content item 804 to the first display $108_1$ and to each of the other screen displays $108_2$-$108_n$. It is contemplated that an example first device $102_1$, includes a point and click command to control the pin operation 722. It is contemplated that in an example first device $102_1$, a user can cause the cursor 808 to hover over the first content item 804 while imparting a command via a click action to activate the pin operation 722 (the "yes" branch), which causes sending of information indicating the pinning of the first content item 804, over the network 104 to the presentation management system 106. At operation 724, the presentation management system 106 sends over the network 104 to the multiple devices, e.g., $102_1$ to $102_n$, information identifying the pinned relocated content item 804. At operation 726, the multiple devices designate the pinned first content item for keeping on-screen even after a different slide, other than the first slide $742_1$, is selected and displayed. In an example first device $102_1$, a pin icon 810 is displayed at the first content item 804 to indicate that it is pinned.

The screen image of FIG. 8E shows changes in the image presented on the first display screen $108_1$ caused by a user-controlled second activation of the slide selection operation 708. The pinned relocated first content item 804 and a second slide $742_2$ are displayed at the first display screen $108_1$, but the second relocated content item 806 is no longer displayed. The second activation of the slide selection operation 708 triggers performance of operation 710, 712 and 714. In the example occurrence of the second method 700, operations 712 and 714 cause a second slide $742_2$ in the slide sequence to be displayed at the display screens $108_1$-$108_n$. The second slide $742_2$ replaces the first slide $742_1$, which is no longer displayed. Operation 714 causes the devices $102_1$-$102_n$ to remove of the unpinned relocated second content item 806 from the display screens $108_1$-$108_n$, while the pinned relocated first content item 804 continues to be displayed at the display screens $108_1$-$108_n$.

Thus, in FIG. 8E, even though the first slide $742_1$ is supplanted by a second slide $742_2$ from the slide sequence, display of the first content item 804, which was relocated from the first slide $742_1$, persists. An image of user-selected component (the first content item 804) of the first slide $742_1$ persists on the screen displays $108_1$-$108_n$ (only $108_1$ is shown) even though the user has caused the slide presentation sequence to progress from the first slide $742_1$ to the second slide $742_2$.

The pinning of relocated content item 808 during display of the second slide $742_2$, improves performance of the presentation system 100. More specifically, in the example of FIGS. 8A-8E for instance, performance of the presentation system 100 is improved since a selected content item 804, which is relocated and pinned, is displayed persistently independent from the slide $742_1$ from which it is relocated, and therefore, requires less display screen area for its display than when it was included in the slide $742_1$. The reduced display screen area required to display the relocated pinned content item 804 allows for its persistent display on the display screen $108_1$ during presentation of subsequent content items e.g., 812-816 included in a subsequent slide $742_2$. Thus, display screen area is more efficiently used to display a content item 804 selected by a user, through relocation and pinning, to be a content item that is emphasized during a presentation.

FIGS. 9A-9E represent an illustrative example second sequence of screen display images caused to be presented at first and second devices $102_1$-$102_2$ of the presentation system 100 of FIG. 1 based upon the first method 300 of FIG. 3. In the illustrative example sequence of FIGS. 9A-9E, only two devices $102_1$ and $102_2$ are communicatively coupled to the presentation management system 160, i.e., n=2.

Referring to FIG. 3, at operation 302, the first device $102_1$ sends a first MPIS $902_1$ and the second device $102_n$ sends a second MPIS $902_2$ over the network 104 to the presentation management system 106. The sending operation 302 involves each of the devices $102_1$, $102_2$ streaming its MPIS $902_1$, $902_2$ over the network 104 to the presentation management system 106, throughout the second sequence of display screen images. At operation 304, the presentation management system 106 receives the first MPIS $902_1$ and the second MPIS $902_2$ and them over the network 104 to the first and second devices $102_1$ and $102_n$. At operation 306, the first and second devices $102_1$ and $102_2$, display on their screen display, e.g., $108_1$ and $108_2$ the first MPIS $902_1$ and the second MPIS $902_2$.

Referring to FIGS. 9A-9E, there is shown a representation of a first display screen $108_1$ of the first device $102_1$, which displays both the first MPIS $902_1$ and the second MPIS $902_2$. Both the first MPIS $902_1$ and the second $MPIS_2$ also are displayed at the display screen $108_2$ of the second device $102_2$, which is not shown, for efficiency and economy of disclosure and to avoid over-complicating the drawings. Moreover, the illustrative example first and second MPIS $902_1$ and $902_2$ appear to portray a static scene. However, the actual first MPIS $902_1$ and second MPIS $902_2$ can include a live video feeds that portray one or more objects in motion.

Figure 9A:
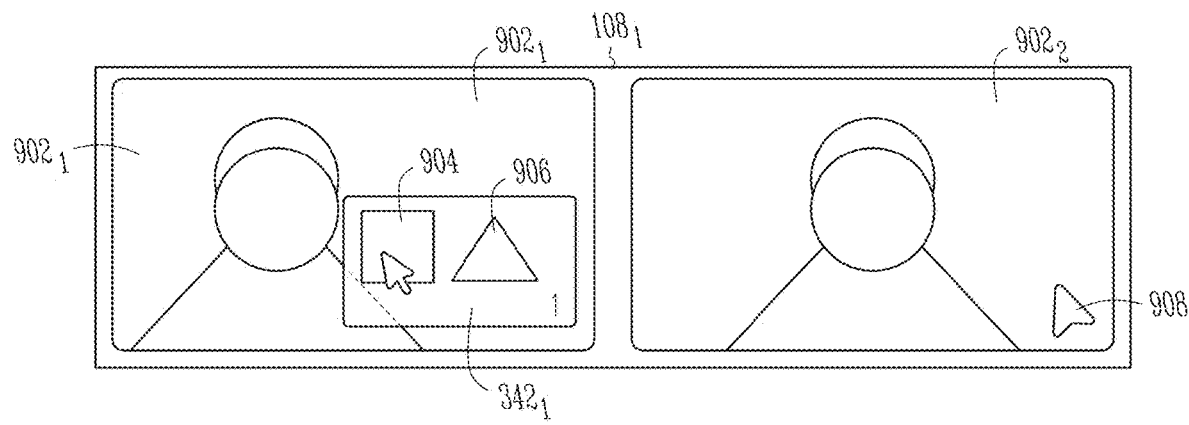
FIGS. 9A-9E represent an illustrative example second sequence of screen display images presented at first and second devices of the presentation system of FIG. 1 based upon the first method of FIG. 3.

The screen image of FIG. 9A shows display of a first slide $342_1$ caused by a first activation of a slide selection operation 308. In this example the first device $102_1$ initially acts as the presenter device. Referring to FIG. 3, at a first occurrence of slide selection operation 308, the first device $102_1$ receives input from the first input device $109_1$ indicating a user-initiated slide selection event in which an example first slide e.g., $342_1$ is selected from within the storage device 126 for display. Decision operation is in a wait state 309 while awaiting such input. Also, at the first activation of slide the selection operation 308, the first device $102_1$ sends information indicating the selection of the first slide, e.g., $742_1$, over the network 104 to the presentation management system 106. At a first occurrence of operation 310, the presentation management system 106 sends over the network 104 to the first and second devices $102_1$ and $102_2$, information to cause display of the selected first slide $342_1$. A first occurrence of operation 312 causes the first and second devices $102_1$ and $102_2$ to display on their screen displays $108_1$ and $108_2$ the first slide $342_1$ that includes a first content item 904 and a second content item 906. In this example, the first slide $341_1$ is displayed overlaying a portion of the first MPIS $902_1$. It is noted that operation 314 is not activated in this first occurrence of slide selection operation 308 since in this example, no slide was displayed before the first slide $342_1$, which is the first slide in the example slide sequence.

Figure 9B:
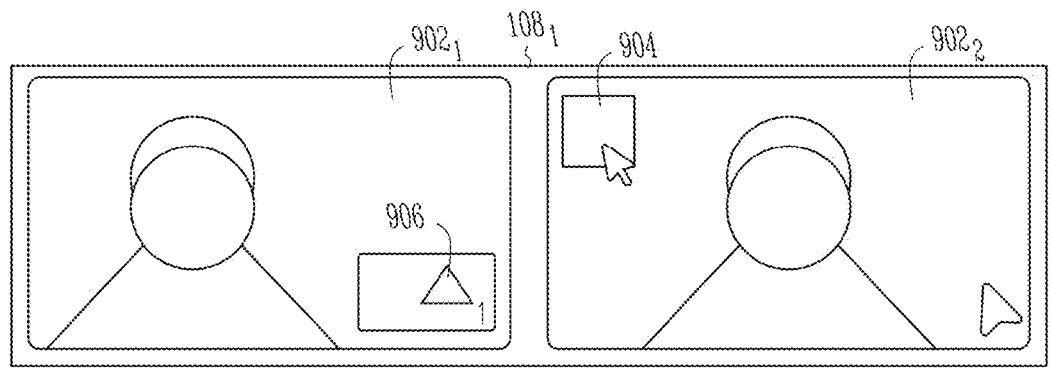

The screen image of FIG. 9B shows the use of the first device $102_1$ to relocate the first content item 904 from the first slide $342_1$ to a portion of the first display screen $108_1$ that displays the second $MPIS_2$. A first occurrence of user activation and control of the relocation operation 316, using a cursor 908, causes the relocation of the first content item 902. At the first example activation of relocation operation 316, the first device $102_1$, receives input from the first input device $109_1$, indicating a user-initiated relocation command information that requests relocation of the first content item 904 from the first slide $342_1$ to a portion of the first screen $108_1$ in which the second MPIS $902_2$ is displayed, causing the relocated first content item 804 to overlay a portion of the second MPIS $902_2$. Operations 318 and 320 run as explained above, using the first device $102_1$, to cause display of the first content item 904 at portions of the first and second display screens $108_1$ and $108_2$ in which the second MPIS $902_2$ is displayed.

Figure 9C:
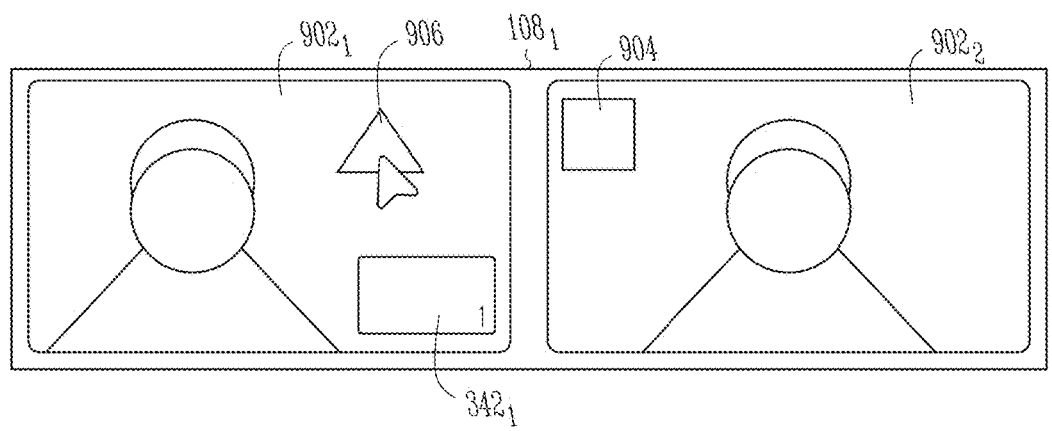

The screen image of FIG. 9C shows relocation of the second content item 906 from the first slide $342_1$ to a portion of the first display screen $108_1$ that displays the first $MPIS_1$. In this illustrative sequence, the device that acts as relocator device is changed to be device $102_2$. So that the relocation of the second content item 906 is controlled using the second device $102_2$. It is contemplated that such change in relocator device can be caused through user information inputted using the cursor 908 at one of the devices $102_1$, $102_2$, that is communicated over the network 104 to the presentation management system 106, which in turn, sends information over the network 104 to the first and second devices $102_1$, $102_2$ to change the presenter device or the relocator device.

Still referring to the screen image of FIG. 9C, the second device $102_2$ is used to cause the second content item 906 to be relocated from the first slide $342_1$ to a portion of the first display screen $108_1$ that displays the first $MPIS_1$. A second occurrence of user activation and control of the relocation operation 316, using a cursor 908, causes the relocation of the first content item 902. Operations 316, 318 and 320 run as explained above, except this time activated and controlled using the second device $102_2$, to cause display of the second content item 906 at portions of the first and second display screens $108_1$ and $108_2$ in which the first MPIS $902_1$ is displayed.

Figure 9D:
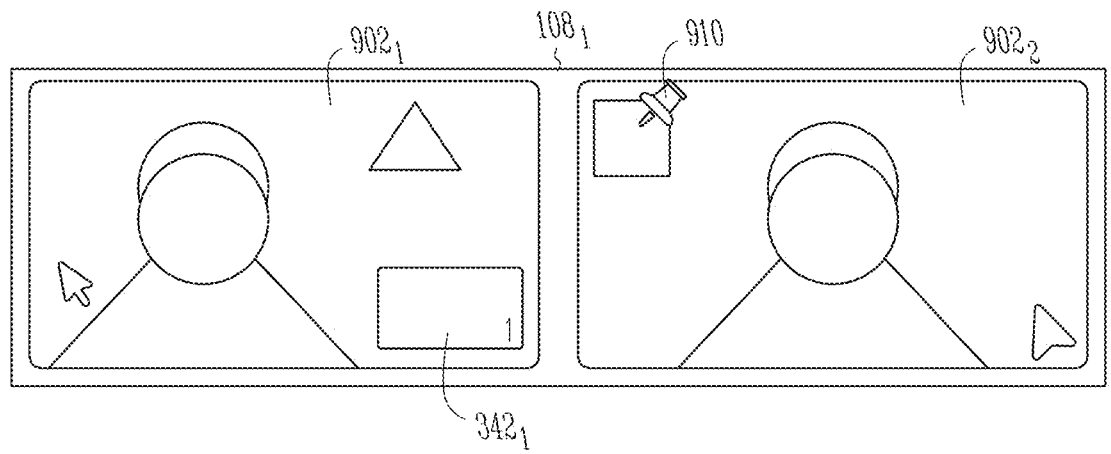

The screen image of FIG. 9D shows a pin icon 910 that represents pinning of the first content item 904 from the first slide $342_1$ to a portion of the first display screen $108_1$ that displays the second $MPIS_2$. In this example, it is assumed that the second device $102_2$ is the device used to cause the pinning of the first content item 904 through activation and control of the pin operation 322 and corresponding operations 324 and 326, which are described above. The pin icon 910 is displayed on both the first and second display screens $108_1$, $108_2$.

Figure 9E:
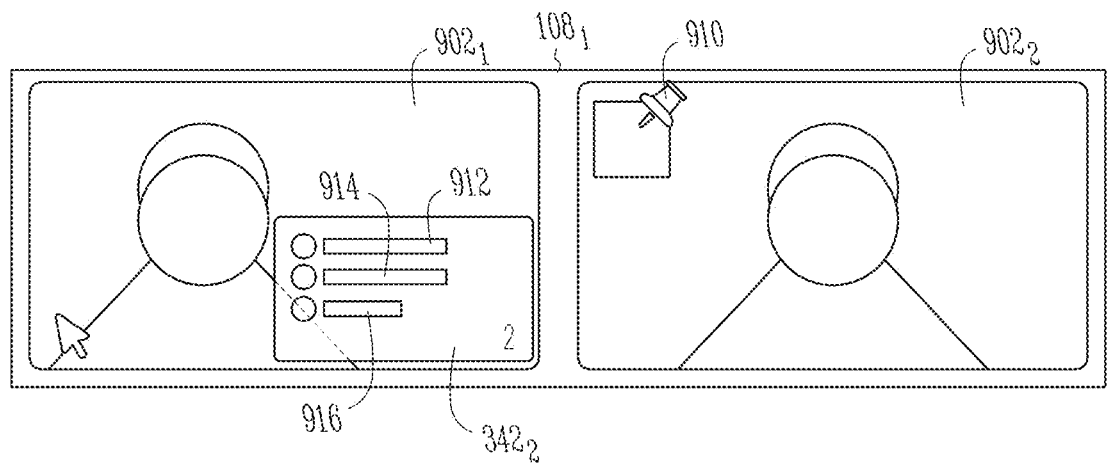

The screen image of FIG. 9E shows changes in the image presented on the first display screen $108_1$ caused by a user-controlled second activation of the slide selection operation 308. In this example, it is assumed that the second device $102_2$ acts as a presenter device used to cause the second occurrence of the slide selection operation 308. The pinned relocated first content item 904 and a second slide $342_2$ are displayed at the first display screen $108_1$, but the second relocated content item 906 is no longer displayed. The second activation of the slide selection operation 308 triggers performance of operation 310, 312 and 314. Operations 312 and 314 cause a second slide $342_2$ in the slide sequence to be displayed at the display screens $108_1$ and $108_2$. The second slide $342_2$ includes third, fourth and fifth content items 812, 814, 816. The second slide $342_2$ replaces the first slide $342_1$, which is no longer displayed. Operation 314 causes the first and second devices $102_1$ and $102_2$ to remove the unpinned relocated second content item 906 from the first and second display screens $108_1$, $108_2$, while the pinned relocated first content item 904 continues to be displayed at the first and second display screens $108_1$, $108_2$.

Thus, in the image sequence and process represented by FIGS. 9A-9E, users can work collaboratively, to relocate content items from slides to MPISs. Moreover, different content items can be moved to overlay different MPISs. Additionally, content items can be pinned so that the display of a pinned content item persists in device display screens even after a slide from which the content item is relocated is supplanted by a different slide with different content items.

Figure 10A:
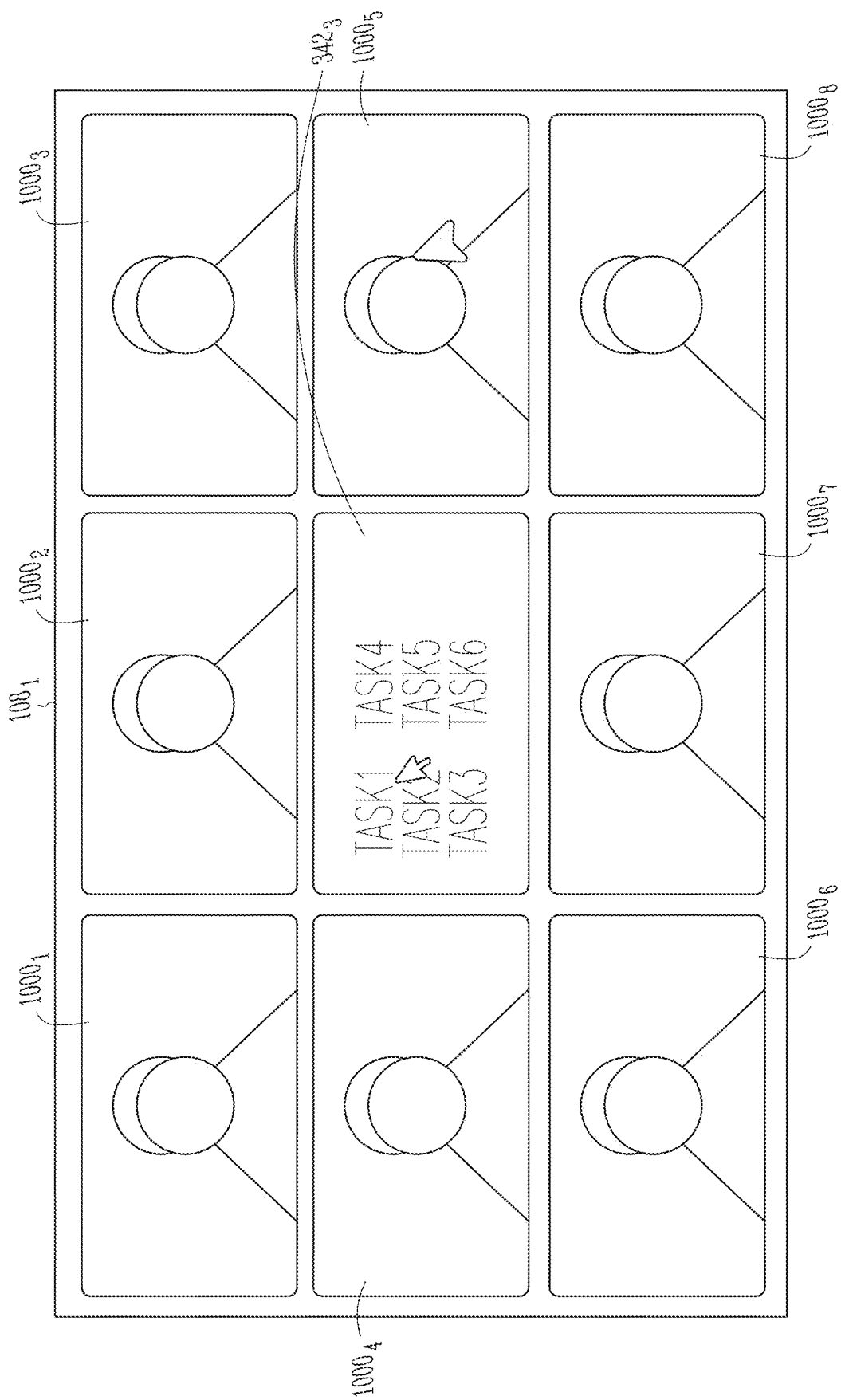

FIGS. 10A-10B represent an illustrative example third sequence of screen display images caused to be presented at first and second devices $102_1$-$102_8$ of the presentation system 100 of FIG. 1 based upon the first method 300 of FIG. 3. In the illustrative example third sequence of screen display images, eight example devices $102_1$-$102_8$ are communicatively coupled to the presentation management system 160, i.e., n=8. FIGS. 10A-10B show a representation of a first display screen $108_1$ of the first device $102_1$, which displays a first MPIS $1000_1$ through an eighth MPIS $1000_8$ and that also displays an example third slide $342_3$. The MPISs $1000_1$-$1000_8$ and the third slide $342_3$ also are displayed on the second through eighth devices $102_2$-$102_8$, which, are not shown for, is not shown and to avoid over-complicating the drawings. As explained above, in the example presentation system, the first MPIS $1000_1$ is captured at the first device $102_1$; the second MPIS $1000_2$ is captured at the second device $102_2$; the third MPIS $1000_3$ is captured at the third device $102_3$; etc. Referring to FIG. 3, pursuant to operation 302, each of devices $102_1$-$102_8$ sends a corresponding MPIS $1000_1$-$1000_8$ to the presentation system 106. Pursuant to operation 304, the presentation system 106 sends the received MPISs $1000_1$-$1000_8$ to each of the individual devices $102_1$-$102_8$. Moreover, MPISs $1000_1$-$1000_8$ appear to porslide a static scene. However, actual MPISs $1000_1$-$1000_8$ can include live video feeds that porslide one or more objects in motion.

FIGS. 10A-10B show the first display screen $108_1$ displaying the third slide $342_3$ at a portion of the display screen separate from the MPISs, such that the third slide $342_3$ does not overlay any of the MPISs. However, in an alternative example display screen (not shown) displaying a plurality of MPISs e.g., $1000_1$-$1000_8$, a slide can overlay one or more of the MPISs. FIG. 10A shows the example third slide $342_3$ as including six content items identified as Task1 to Task6. FIG. 10B shows the third slide including only content items identified as Task4 and Task6, shows content item Task1 having been relocated from the third slide $342_3$ to overlay a portion of the second MPIS $1000_2$, shows content item Task2 having been relocated from the third slide $342_3$ to overlay a portion of the seventh MPIS $1000_7$, shows content item Task3 having been relocated from the third slide $342_3$ to overlay a portion of the eighth MPIS $1000_8$, shows content item Task5 having been relocated from the third slide $342_3$ to overlay a portion of the third MPIS $1000_3$.

The first method 300 represented in FIG. 3 can be used by one or more of user-1 to user-8 to relocate content items Task1, Task2, Task3, and Task5 as shown in the example third sequence of screen display images of FIGS. 10A-10B. For example, in a first illustrative example scenario of relocation of the content items Task1, Task2, Task3, and Task5, the first device $102_1$ acts as the sole presenter device that activates the slide selection operation 308 and related operations 310, 312 to cause the display of the third slide $342_3$ at each of display screens $108_1$-$108_8$, and also, to activate multiple times, the relocation operation 316 and related operations 318, 320 to cause the relocation of content items, Task1, Task2, Task3, and Task5, as shown, at each of the display screens $108_1$-$108_8$. Thus, in the first illustrative example scenario, user-1 of the first device $102_1$, can control the distribution of the content items.

In a second illustrative example scenario of relocation of the content items Task1, Task2, Task3, and Task5, more than one device acts as a presenter or relocator device. For example, the third device $102_3$, acting as a presenter device, activates the slide selection operation 308 and related operations 310, 312 to cause the display of the third slide $342_3$ at the first to eighth display screens $108_1$-$108_8$. In this second illustrative example scenario, the second device $102_2$, acting as a relocator device, activates the relocation operation 316 and related operations 318, 320 a first time to cause the relocation of content item, Task1 to overlay the second MPIS $1000_2$ on each of display screens $108_1$-$108_8$. In this second illustrative example scenario, the second device $102_2$, acting as the presenter, activates the relocation operation 316 and related operations 318, 320 a second time to cause the relocation of content item, Task2 to overlay the seventh MPIS $1000_7$ on each of display screens $108_1$-$108_8$. In this second illustrative example scenario, the third device $102_3$, acting as the presenter, activates the relocation operation 316 and related operations 318, 320 a third time to cause the relocation of content item, Task3 to overlay the eighth MPIS $1000_8$ on each of display screens $108_1$-$108_8$. In this second illustrative example scenario, the third device $102_3$, acting as the presenter, activates the relocation operation 316 and related operations 318, 320 a fourth time to cause the relocation of content item, Task5 to overlay the third MPIS $1000_3$ on each of display screens $108_1$-$108_8$.

In a third illustrative example scenario of relocation of the content items Task1, Task2, Task3, and Task5, more than one device acts as a presenter or relocator device. For example, the third device $102_3$, acting as a presenter, activates the slide selection operation 308 and related operations 310, 312 to cause the display of the third slide $342_3$ at the first to eighth display screens $108_1$-$108_8$. In this third illustrative example scenario, the second $102_2$, acting as a relocator device, activates the relocation operation 316 and related operations 318, 320 a first time to cause the relocation of content item, Task1 to overlay the second MPIS $1000_2$ on each of display screens $108_1$-$108_8$. In this third illustrative example scenario, the seventh device $102_7$, acting as the presenter, activates the relocation operation 316 and related operations 318, 320 a second time to cause the relocation of content item, Task2 to overlay the seventh MPIS $1000_7$ on each of display screens $108_1$-$108_8$. In this third illustrative example scenario, the eighth device $102g$, acting as the presenter, activates the relocation operation 316 and related operations 318, 320 a third time to cause the relocation of content item, Task3 to overlay the eighth MPIS $1000_8$ on each of display screens $108_1$-$108_8$. In this third illustrative example scenario, the third device $102_3$, acting as the presenter, activates the relocation operation 316 and related operations 318, 320 a fourth time to cause the relocation of content item, Task5 to overlay the third MPIS $1000_3$ on each of display screens $108_1$-$108_8$.

Gesture-Based Relocation of Content Items Between MPISs

Figure 11:
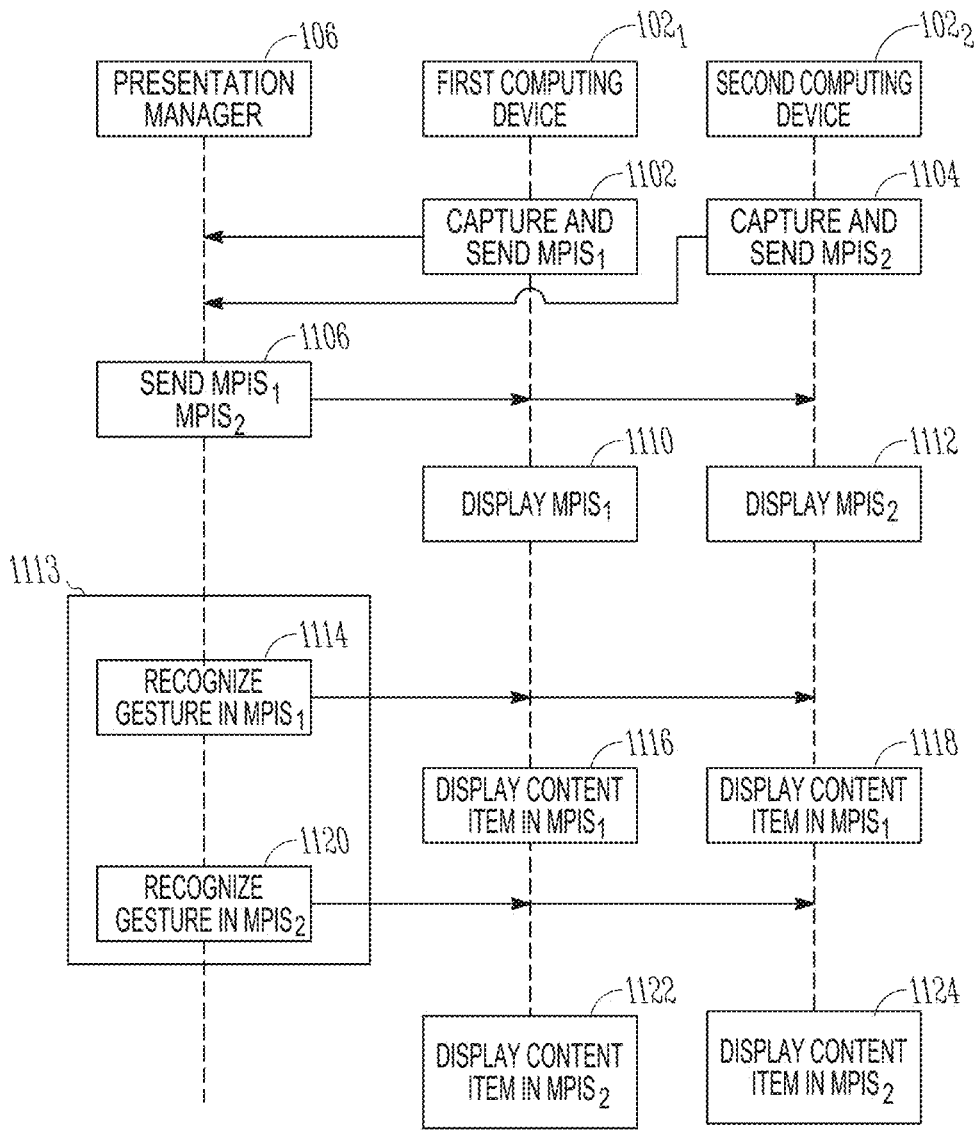
FIG. 11 is an illustrative sequence flow diagram representing an example gesture-based method to cause transfer of a content item image between two motion picture image streams.

FIG. 11 is an illustrative sequence flow diagram representing an example gesture-based method 1100 to cause transfer of a content item image between two motion picture image streams (MPISs). Each MPIS is displayed at each two computing devices, based upon user gestures captured at the computing devices. One or more processor circuits of the presentation management system 106 and one or more processor circuits of each of two or more of devices $102_1$ to $102_n$, are specially configured according to computer executable code to implement the operations of the gesture-based method 1100.

At operation $110_2$, a first computing device $102_1$ captures a first motion picture image stream (MPIS) and sends the first MPIS$_1$ to a presentation management system 106. At operation 1104, a second computing device $102_2$ captures a second MPIS and sends the second $MPIS_2$ to the presentation management system 106. At operation, 1106, the presentation management system 106 sends information to cause the first and second computing devices $102_1$, $102_2$ to display both the first $MPIS_1$ and the second $MPIS_2$ at display screens $108_1$, $108_2$. In an example presentation system 100, the presentation management system 106 sends the first $MPIS_1$ and the second $MPIS_2$ to each of the first and second devices $102_1$, $102_2$. At operation 1110, the first computing device $102_1$ displays both the first $MPIS_1$ and second and the second $MPIS_2$ at the first display screen $108_1$. At operation 1112, the second computing device $102_2$ displays both the first $MPIS_1$ and second $MPIS_2$ at the second display screen $108_2$.

A two-part gesture recognition and relocation operation 1113 causes relocation of a content item from the first $MPIS_1$ captured at the first computing device $102_1$ to the second $MPIS_2$ captured at the second computing device $102_2$. A first-occurring gesture is recognized at operation 114. A second-occurring gesture is recognized at operation 1120.

More particularly, at operation 1114, the presentation management system 106 recognizes the first-occurring gesture within the first $MPIS_1$. Based upon the recognized first-occurring gesture, the presentation management system 106 and sends information to the first and second computing machines $102_1$, $102_2$ to cause display of a content item image over a portion of the first MPIS in both the first and second computing devices $102_1$, $102_2$. At operation 1116, the first computing device $102_1$ displays the content item image over the portion of the first $MPIS_1$ at the first display screen $108_1$. At operation 1118, the second computing device $102_2$ displays the content item image over the portion of the first $MPIS_1$ at the second display screen $108_2$.

At operation 1120, the presentation management system 106 recognizes the second-occurring gesture within the second MPIS. Based upon the recognized second-occurring gesture, the presentation management system 106 and sends information to the first and second computing machines $102_1$, $102_2$ to cause display of the content item image over a portion of the second MPIS in both the first and second computing devices $102_1$, $102_2$. At operation 1122, the first computing device $102_1$ displays the content item image over the portion of the second MPIS at the first display screen $108_1$. At operation 1124, the second computing device $102_2$ displays the content item image over the portion of the second MPIS at the second display screen $108_2$.

It will be appreciated that through the gesture-based method 1100, a first user at the first device $102_1$ and a second user at the second device $102_2$ can communicate visually via the first-occurring gesture and the second-occurring gesture, displayed in the first MPIS and in the second MPIS, of the opportunity and intent to cause relocation of a content item from the first MPIS to the second MPIS.

A first user at the first device $102_1$ uses the first-occurring gesture to provide a visual queue to a second user at the second device $102_2$ of an opportunity to relocate of the content item from the first MPIS to the second MPIS. Specifically, the first-occurring gesture is visible in the first MPIS, which is displayed at both at the first device and the second device. The presentation management system 106 recognizes the first-occurring gesture and causes display of the content item over the portion of the first MPIS displayed at the first and second devices $102_1$, $102_2$. Thus, the first user at the first device $102_1$ and the second user at the second device $102_2$ can view the first-occurring gesture within the first MPIS and can view the content item displayed within the first MPIS in response to the first-occurring gesture.

Conversely, a second user at the second device $102_2$ uses the second-occurring gesture to provide a visual queue to the first user at the first device $102_1$ of intent to relocate the content item from the first MPIS to the second MPIS. Specifically, the second-occurring gesture is visible in the second MPIS, which is displayed at both at the first device $102_1$ and the second device $102_2$. The presentation management system 106 recognizes the second-occurring gesture and causes display of the content item over the portion of the second MPIS displayed at the first and second devices $102_1$, $102_2$. Thus, the first user at the first device $102_1$ and the second user at the second device $102_2$ can view the second-occurring gesture within the second MPIS and can view the relocated display of the content item within the second MPIS in response to the second-occurring gesture.

While the illustrative example sequence flow diagram of FIG. 11 shows only two example computing devices $102_1$ and $102_2$, it will be understood that the gesture-based method 1100 method can be performed with more than two computing devices and more than two MPISs. In the example presentation system 100 that includes more than two computing devices, i.e., computing devices $102_1$-$102_n$, where n>2, a first-occurring gesture can occur in an MPIS of any one of the n devices and a second-occurring gesture can occur in an MPIS in any other one of the one of the n devices. Thus, a user any one of the n devices $102_1$-$102_2$ can send a visual queue, via a first-occurring gesture, within an MPIS corresponding to that device, of an opportunity to relocate a content item, and a user at any other one of the n devices $102_1$-$102_2$ can send a visual queue, via a second-occurring gesture, within an MPIS corresponding to that other device, of an intent to relocate the content item to the MPIS of that other device.

Figure 12:
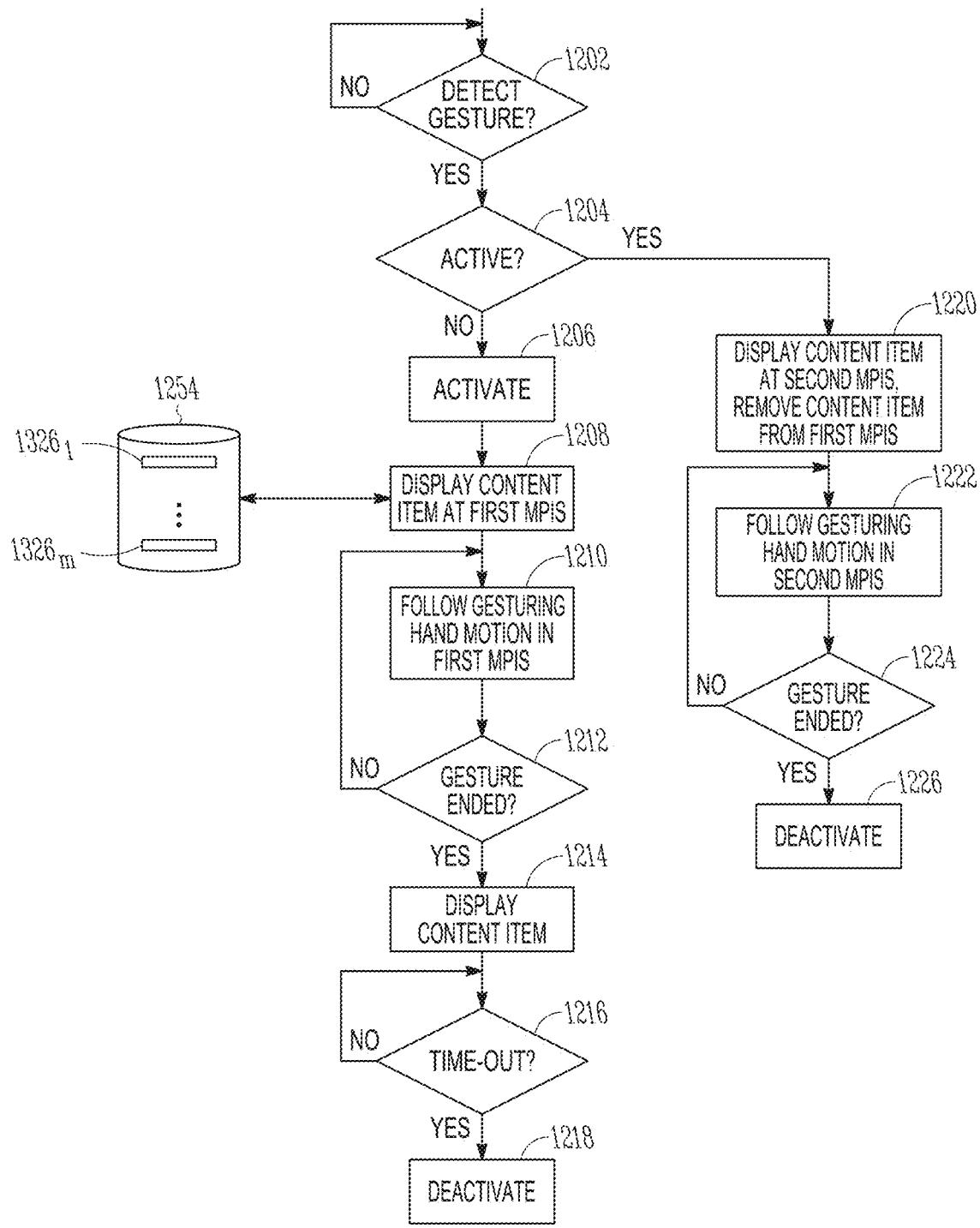
FIG. 12 is an illustrative flow diagram representing a contemplated method to implement a gesture recognition operation of FIG. 11.

FIG. 12 is an illustrative flow diagram representing a contemplated method 1200 to implement the gesture recognition operation 1113 of FIG. 11. One or more processor circuits of the presentation management system 106 are specially configured according to computer executable code to implement the gesture recognition operation. In an example presentation system 100, the first-occurring gesture and the second-occurring gesture are identical. More particularly, in an example presentation system, the first-occurring gesture and the second-occurring gesture both includes an open hand with palm facing the image capture device.

Operation 1202 determines whether the gesture is detected within either one of a first MPIS captured at the first computing device $102_1$ or within a second MPIS captured at the second computing device $102_2$. In an example embodiment, gestures are detected by applying a machine-learned image recognition model previously trained to recognize gesture image patterns in an MPIS. An example operation 1202 executes an image recognition module 1203 on one or more processors of the presentation management system 106.

Contention operation 1204 determines whether the relocation operation 1113 is in an active state. In response to a determination at operation 1204 that the relocation operation is not in an active state, operation 1206 transitions the relocation operation to the active state. It will be understood that a prior occurrence of the gesture in a different MPIS already may have been recognized and have caused the relocation operation 1113 to enter the active state. Moreover, it will be appreciated for economy of disclosure, only two computing devices and only two MPISs are described. However, an actual implementation of the presentation system 100 can include many more devices and many more MPISs and any two of these can correspond to the first and second devices and the first and second MPISs.

Operation 1208 causes display of a content item over a portion of the first MPIS. In an example presentation system 100, operation 1208, causes display of a selected content item superimposed over a portion of an image of a first object, specifically, palm of a first user's hand in an open hand formation gesture within the first MPIS. In an example system, multiple content items $1326_1$-$1326_m$ are stored in a memory device 1254 and are available for display. It is contemplated that a user can select a content item for gesture-based display using an input device $109_1$ such as a pointing device such as a mouse device, for example.

Operation 1210 causes the selected content item image to follow motion of the first user's hand in the open hand formation gesture such that a user at the first MPIS can maneuver the content item about the two-dimensional first MPIS by maneuvering the open hand formation in front of an image capture device $108_1$ at the first computing device $102_1$. Operation 1212 determines whether the gesture has ended at the first MPIS. In an example presentation system 100, the gesture is recognized as ended within the first MPIS when an open hand formation image no longer is detected by the image recognition module 1203. In an example system 100, a user at the first device $102_1$ can change the formation of the hand from open hand formation to a fist formation, for example, to cause the image recognition module 1203 to recognize the ending of the gesture within the first MPIS. In response to a determination at operation 1212 that the gesture has not ended within the first MPIS, operation 1210 continues to cause the image of the content item to follow the gesture image e.g., the open hand formation. In response to a determination at module 1212 that the gesture has ended within the first MPIS, operation 1214 causes display of the selected content item within the first MPIS, at the last location at which the hand formation gesture appeared before the first gesture ended, independent of whether the user's hand continues to be displayed in a non-gesture fist formation. Time-out operation 1216 determines whether the content item has been displayed for a time interval longer than a time-out interval. If the timeout period is reached, then operation 1218 deactivates the recognition state and causes the selected content item to disappear from the first MPIS. Otherwise, operation continues to display the selected content item within the MPIS.

Referring again to contention operation 1204, in response to a determination at operation 1204 that the relocation operation already is in the active state, operation 1220 causes display of the content item to disappear from the first MPIS and to appear in the second MPIS. In an example presentation system 100, operation 1220, causes display of the content item superimposed over a portion of an image of a second object, specifically, a palm of a second user's open hand formation gesture within the second MPIS. Operation 1222 causes the content item image to follow motion of the palm of the second user's open hand formation such that the second user at the second device $102_2$ can maneuver the content item about the two-dimensional second MPIS. Operation 1224 determines whether the gesture has ended at the second MPIS. If no, then operation 1222 continues. If yes, then operation 1226 deactivates the relocation operation. The content item may continue to be displayed within the second MPIS at a location to which the second user's open hand formation maneuvered it to be. FIGS. 13A-13L represent an illustrative example fourth sequence of screen display images involving gesture-based presentation and relocation of content items based upon the methods represented in FIGS. 11-12. Two example hand formations are shown. A first hand formation is an open hand formation that is recognized as a gesture. A second hand formation is a closed first hand formation that is not recognized as a gesture. For economy of disclosure, only two computing devices $102_1$ and $102_2$ are communicatively coupled in the illustrative example fourth sequence i.e., n=2. It will be appreciated, however, that the same principles apply where a larger number of devices are included. FIGS. 13A-13L depict a first $MPIS_1$ and a second $MPIS_2$ displayed at the first display screen $108_1$ at the first device $102_1$. More particularly, FIGS. 13A-13L depict images of a first user, user-1, captured in the first $MPIS_1$, and depict images of a second user, user-2, captured in the second $MPIS_2$. The first MPIS $1300_1$ can be captured using a first image capture device $110_1$. The second MPIS $1300_2$ can be captured using a second image capture device $110_2$.

Figure 13A:
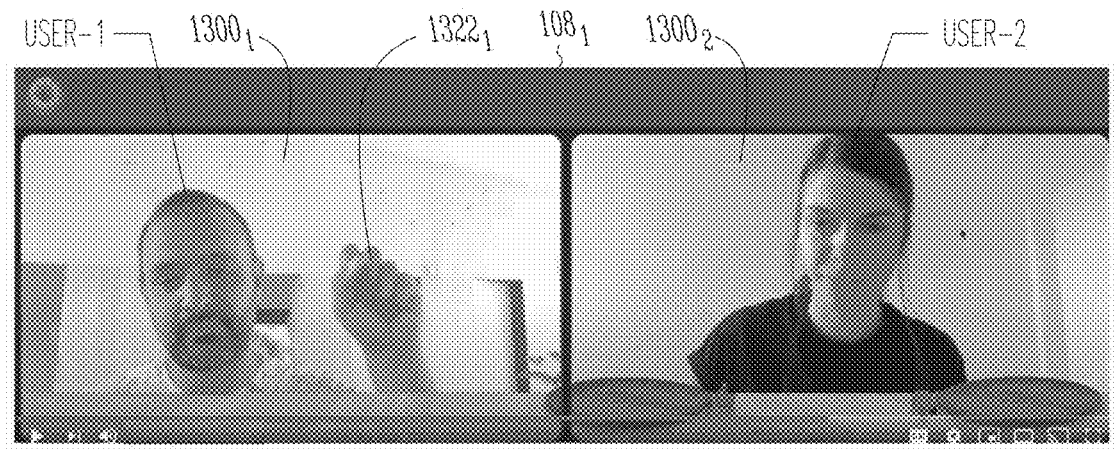
FIGS. 13A-13L represent an illustrative example fourth sequence of screen display images involving gesture-based presentation and relocation of content items based upon the methods represented in FIGS. 11-12.

FIG. 13A depicts an occurrence of the non-gesture first hand formation 1322 in the first $MPIS_1$. This occurrence of the non-gesture first hand formation 1322 consists user-1 raising one hand in a closed fist formation. The gesture recognition and relocation operation 1113 does not recognize the first user's, user-1's, first user's non-gesture first hand formation $1322_1$ as being a meaningful gesture.

Figure 13B:
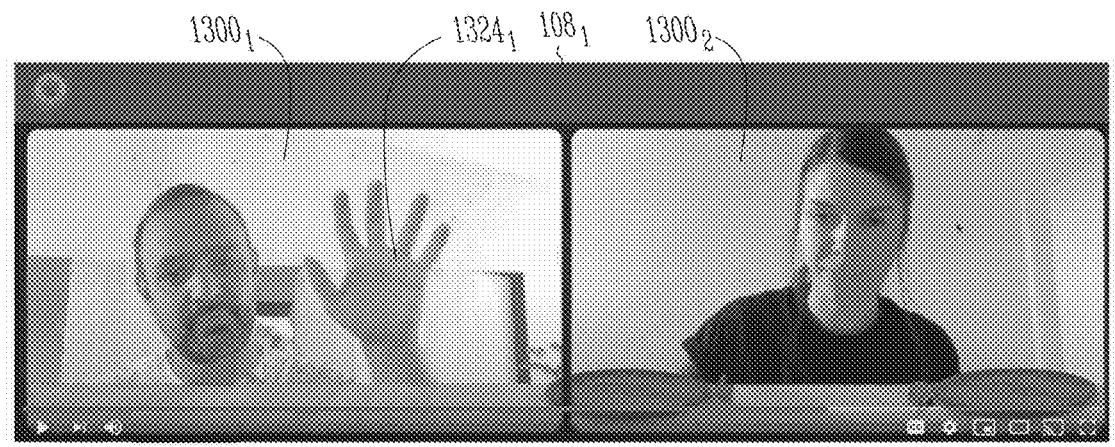

FIG. 13B depicts the first-occurring first user's gesture $1324_1$ in the first $MPIS_1$. This occurrence of the first-occurring first user's gesture $1324_1$ consists of user-1 raising one hand in open hand formation.

Figure 13C:
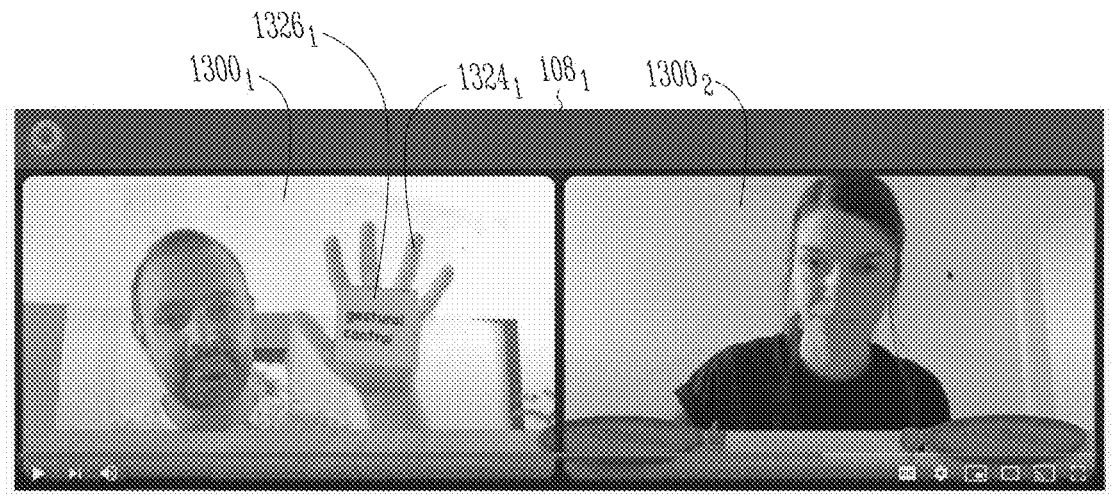

FIG. 13C depicts a content item $1326_1$ aligned with the first-occurring first user's gesture $1324_1$ displayed in the first $MPIS_1$ on display screen $108_1$. In this example, operation 1204 causes display of a selected content item $1326_1$ over a portion of the first-occurring first user's open hand formation gesture $1324_1$ within the first $MPIS_1$ where the first-occurring first user open hand gesture $1224_1$ is detected.

Figure 13D:
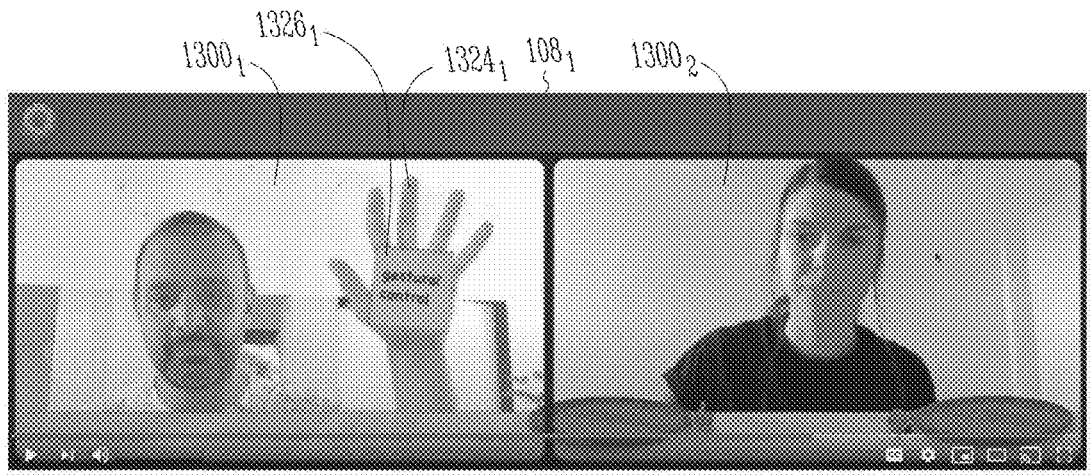

FIGS. 13C-13D depict operation 1210 causing the selected content item $1326_1$ to follow movement of the first occurring open hand gesture $1324_1$ within the first $MPIS_1$. While continuing to make the first-occurring open hand formation gesture $1324_1$, user-1 causes movement of the first user's hand in the open hand formation gesture across the first $MPIS_1$, and operation 1222 causes the content item $1326_1$ to follow along.

Figure 13E:
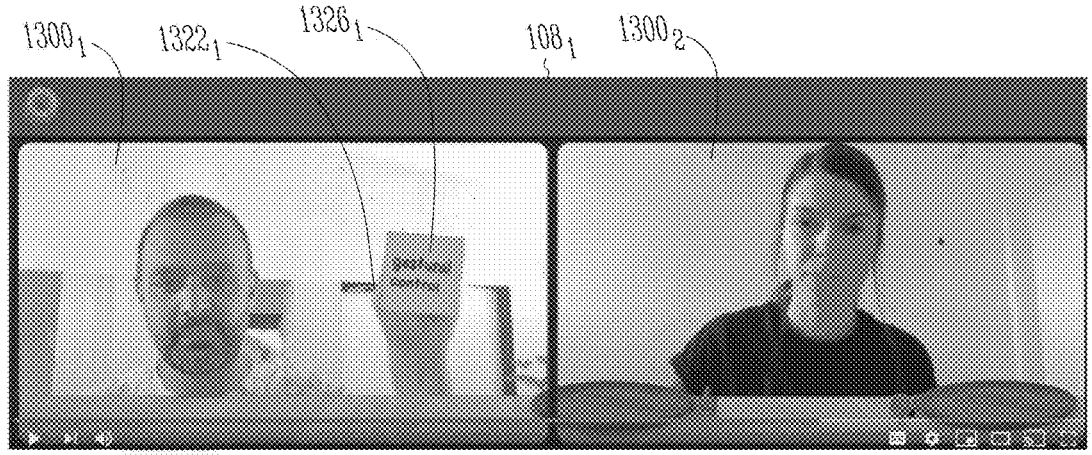
Figure 13F:
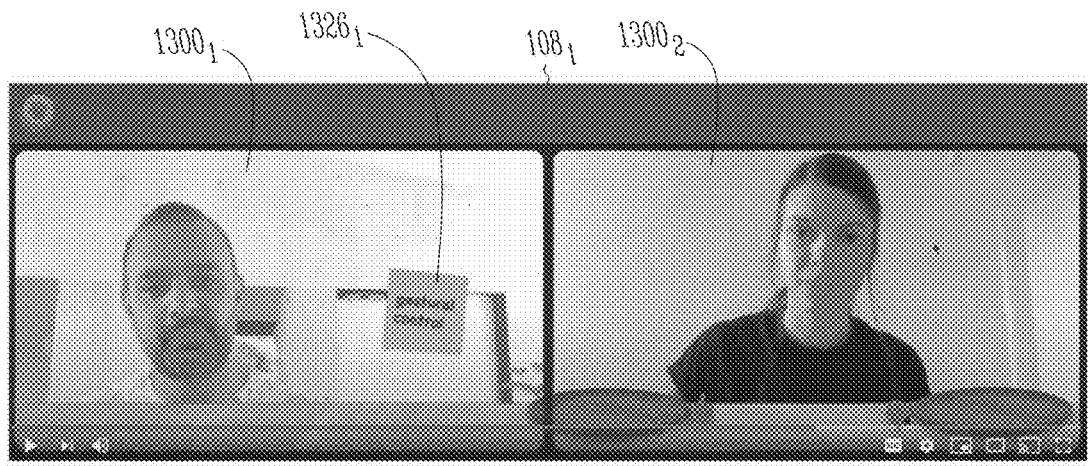

FIGS. 13E-13F depict operation 1214 causing the selected content item continuing to be displayed in the first $MPIS_1$ after the first-occurring gesture ends. In FIG. 13E, the content item $1326_1$ continues to be displayed even as the first user closes the hand to form a first, which is partially obscured behind the content item $1326_1$. It will be appreciated that the first user's hand/fist formation $1322_1$ is not obscured from the perspective of the image capture device $108_1$. In FIG. 13F, the content item $1326_1$ continues to be displayed even as the first user moves the closed fisted hand away from the content item in the first user's non-gesture closed fist formation $1322_1$.

Figure 13G:
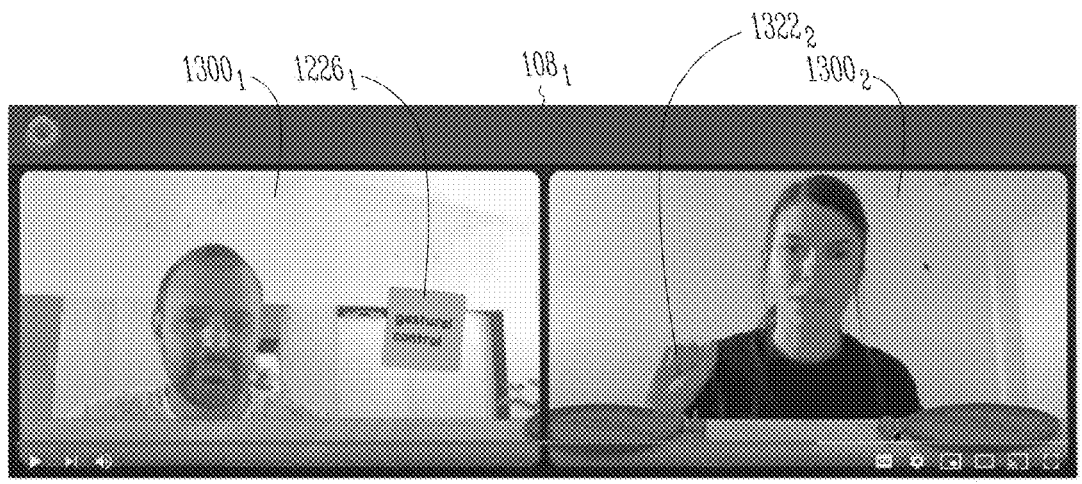
Figure 13H:
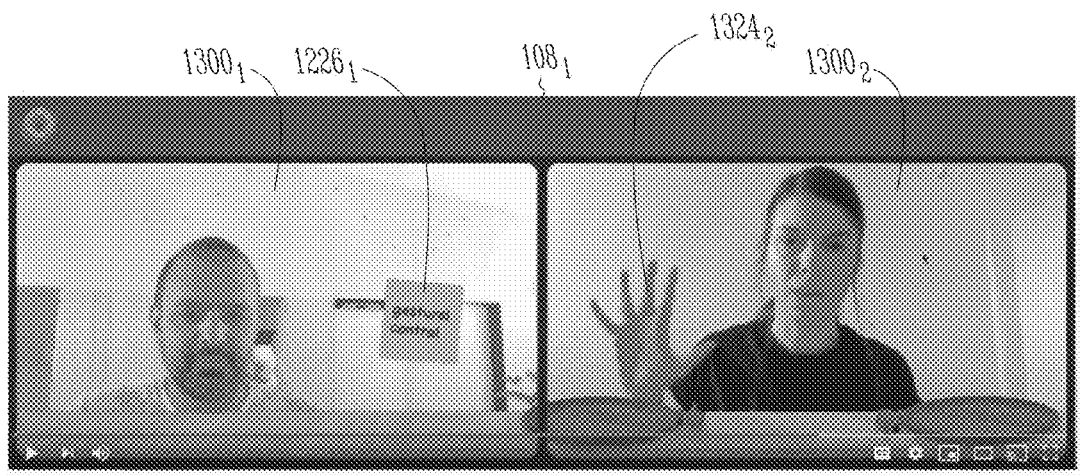

FIG. 13G depicts operation 1210 continuing to cause the content item $1326_1$ to be displayed in the first $MPIS_1$ while the second user, user-2, causes display of a second-occurring second user's non-gesture fist formation hand $1222_2$ within the second $MPIS_2$. The gesture recognition and relocation operation 1113 does not recognize the second-occurring second user (user-2) non-gesture fist hand formation $1322_2$ as being a gesture.

Figure H depicts a second-occurring second user's open hand gesture $1324_2$ in the second $MPIS_2$. This occurrence of the second-occurring second user's gesture $1324_2$ consists of user-2 raising one hand in open hand formation.

Figure 13I:
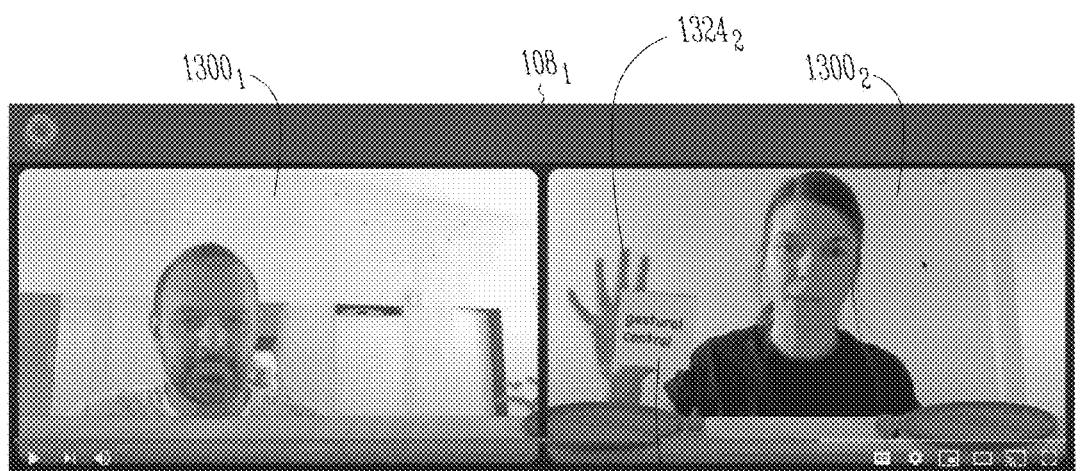

FIG. 13I depicts operation 1220 causing relocation of the content item from the first $MPIS_1$ to the second $MPIS_2$ in response to a second-occurring second user's open hand gesture $1324_2$ within the second $MPIS_2$. In this example, operation 1220 causes display of a selected content item $1326_1$ over a portion of the second-occurring second user's open hand formation gesture $1324_2$ within the second $MPIS_2$ where the second-occurring first user open hand gesture $1224_2$ is detected.

Figure 13J:
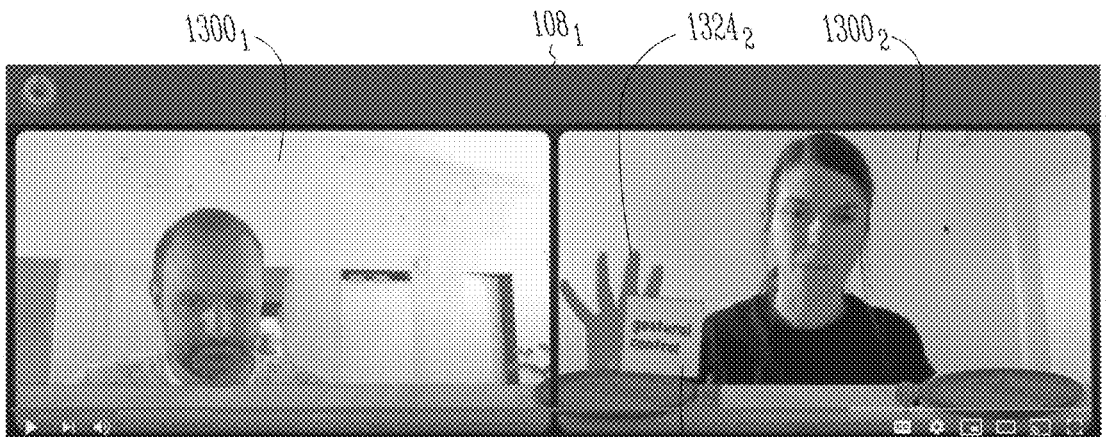

FIG. 13J depict operation 1222 causing the selected content item $1326_1$ to follow movement of the second-occurring second user open hand gesture $1324_2$ within the second $MPIS_2$. While continuing to make the second-occurring second user open hand formation gesture $1324_2$, user-2 causes movement of the second user's hand in the open hand formation gesture across the second $MPIS_2$, and operation 1222 causes the content item $1326_1$ to follow along.

Figure 13K:
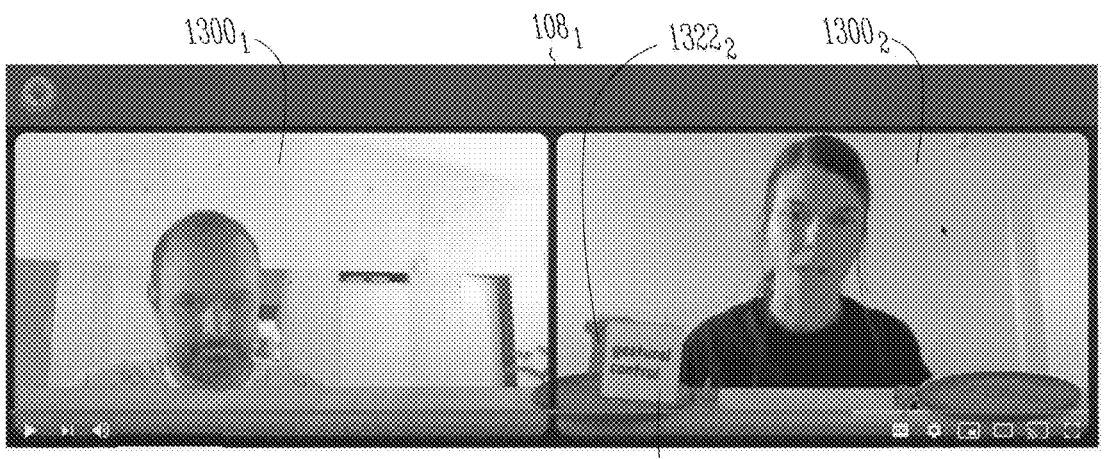

FIG. 13K depicts operation $1224_2$ detecting end of the second-occurring second user open hand gesture as the second reconfigures the second hand to a non-gesture closed fist formation $1222_2$.

Figure 13L:
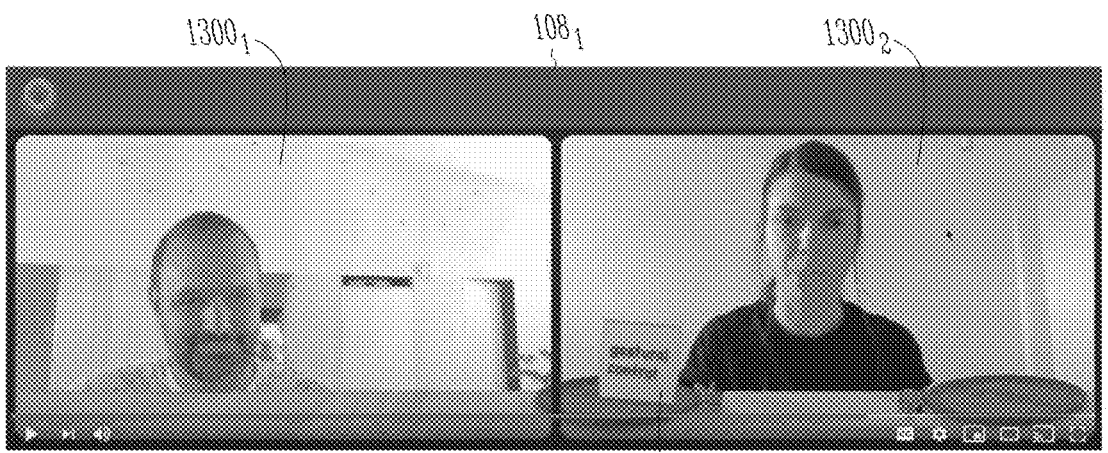

FIG. 13L depicts the deactivate relocation operation 1226 as the selected content item $1326_1$ continues to be displayed within the second $MPIS_2$ even after the second user has relocated the second hand to that the second hand no longer is displayed in the second $MPIS_2$.

The gesture-based relocation of a content item is an improvement to a technology since it permits relocation of a content item between MPISs without need for a user to resort to electronic control devices such as pointing device to click and drag or to cut and paste.

Pre-Processing to Identify Relocatable Content Items within a Slide

A slide can be produced based upon slides prepared for a presentation. That is, presentation slides that contain content items can be used as slides displayed on multiple display screens. A slide can be pre-processed using a computing device configured with executable instructions stored in a computer readable storage device, to identify relocatable content items within the slide. The slide with relocatable content items identified therein, then can be used as slide from which content items can be relocated as described above.

Pre-processing involves identifying parts of a slide, that is to be used as a slide, that are to be relocatable. An example pre-processing method involves analysis of document structure and hierarchy, such as grouped objects, compound objects such as charts with titles and smart art, and also coordinates and geometrical proximity since many users of presentation creation tools construct parts of the slides by putting objects near each other which belong together in their narrative.

An example pre-processing to identify content items involves analyzing a slide constructed using slide presentation software tools, to identify a list of objects types present within the slide and weight the object types in case they have overlapping geometry on the slide. In the case of overlapping of object types that have different weights, the lower precedence object type is incorporated as part of the higher precedence object type. (ACCURATE?—PLEASE CORRECT) An example of hierarchical object types in order of precedence is as follows: (1) Grouped objects; (2) Items of visual lists; (3) Whole visual lists; (4) Compound objects which contain multiple visuals and texts (charts, smart art); (5) Images; (6) Lines of lists of text (e.g., bullet or numbered lists); and (7) Lists of text.

An example pre-processing to identify content items involves analyzing a slide not constructed using slide presentation software tools, to identify layout positions of objects present within the slide. Many users of slide presentation software prefer to create visual layouts simply by adjusting separate objects positions, size, proximity rather than using the built in tools. For example, writing an image caption can be achieved by either using the captioning tools in presentation software, or simply moving a line of text underneath an image. The former will contain a clear relationship between the image and text in the document hierarchy, while the latter will not. In the latter case, pre-processing can determine relationships between objects within a slide based upon proximity and object types. Example pre-processing uses weighted logic to determine which objects are to be grouped together as a relocatable content. The following is an example list of objects groupings into content items and example criteria for the groupings: (1) a text is aligned to a graphic or image; (2) multiple images or graphics are aligned; (3) a text is almost aligned to a graphic or image, meaning there is a threshold (for example 10% of its width) by which if the text was moved, it would be aligned, compensating for the error of manual alignment; (4) same as in (3), but for multiple graphics or images.

In an example pre-processing, preference is given to relationships present in the document hierarchy, and geometrical proximity is used where no document hierarchy is clearly present.

Moreover, an example pre-processing involves creating background layers so e.g., text or other objects that have hollow parts will stay visible over a visually chaotic background comprising an MPIS over which they may be relocated. To achieve this effect, we copy parts of the original slide background color or background image, crop it to a rectangle or circle or rectangle with rounded corners, and make the background color or image 90% opaque, and position it behind the relocatable content item at the time of its relocation. This helps content items such as text or thin line charts to remain legible when overlayed over an MPIS, which may include motion picture the video. For example, a background layer can be positioned beneath relocatable content items such as: (1) Groups of objects; (2) Objects; (3) Line in a list; (4) Words/selection of text; (5) In case of overlapping objects; (6) Put background behind loose items like text.

Practical Use Examples

There are numerous practical uses of relocation of a content item from a slide displayed on display screens of a plurality of computing devices to locations overlaying portions of a motion picture image sequence displayed on the display screens of a plurality of devices has numerous practical uses. The following are just a few illustrative examples.

Pinning Memorable Part of a Single Presenter Example

Referring to FIGS. 8A-8E, for example, in a pinning memorable parts example, a user causes a designated device to relocate and pin the most important content items included within a slide to overlay a portion of a motion picture image sequence. At the end of a presentation of one or more slides, relocations, and pinnings, a visual record is created of the most important parts of a presentation.

Filling Out a Visual Form Example

Referring to FIGS. 9A-9E, for example, a sequence of slides can include content items that provide choices for selection. In a restaurant menu example, each slide can include sections for a course of a meal, selections for— appetizer, main course, desert, for example. A host computing device and a guest computing device participate in an online communication in which motion picture image sequences captured at the host and guest machines are displayed at each machine. The host device causes presentation of a sequence of slides at each of the devices. The guest device, acting as designated device, relocates and pins a content item from each slide in the sequence onto the guest motion picture image sequence, thereby indicating choices for appetizer, main course and desert. At the end of the sequence of sides, relocations, and pinnings, a visual record is created of the guest/user's choices.

Task Assignment Example

Referring to FIG. 10A-10B, for example, in a task assignment example, motion picture image sequences captured at individual devices are distributed such that the display screen of each device displays motion picture images captured at the other devices. Each individual motion picture image sequence, for example, can capture an image of a user of the device where the sequence is captured. Thus, a virtual meeting is created. A slide that includes multiple content items, each corresponding to a task to be assigned, is displayed at the display screens of the plurality of devices. A meeting organizer uses one of the computing devices to assign tasks to individual users by issuing relocation commands that cause relocation of content items from the slide to the motion picture image sequences captured at different devices. A user of a device, where a motion picture image sequence that is overlain by a content item representing a task was captured, is assigned that task. Since each motion picture image sequence displays the user of the device where the sequence is captured, the meeting participants can see to whom each task is assigned.

Collaborative Plan Building Example

Referring to FIGS. 10A-10B, for example, in a collaborative planning example, a sequence of slides is presented. Each slide includes one or more content items. Each slide is created by a different user/participant in an online meeting. Each content item can represent a proposed recommendation to be included in a plan. A plurality of users participates in the online meeting via their computing devices. For each slide in the sequence, individual users can cause relocation of one or more content items from the slide to a motion picture image sequence captured at that user's computing device. Thus, user devices can take turns acting as designated devices. In this example, a copy of a content item can be relocated to more than one motion picture image sequence. Thus, for example, an example content item can be relocated by each of multiple users to the multiple motion picture image sequences captured at the devices of the multiple users. The relocated content items for each slide can be pinned so that they continue to be displayed during display of subsequent slides. Thus, a collaborative plan can be developed through presentation of a sequence of slides and the relocation of content items from the slides to motion picture image sequences by individual users. The relocated content items indicate the recommendations selected by individual users. The motion picture image locations to which the individual content items are located indicate which users selected which recommendations. At the end of the sequence of sides, relocations, and pinnings, a visual record is created of each individual user's recommendations for the collaborative plan.

Real-time Polling Example

Referring to FIGS. 10A-10B, for example, this real-time polling example is similar to collaborative planning except that the slides include polling questions rather than proposed recommendations for a plan. In a real-time polling example, a sequence of slides is presented. Each slide shows a question and includes multiple content items, each content item indicating a different possible answer to the question presented by the slide. Each slide is created by a user developing polling the questions and answers. Each content item on a slide indicates a different possible answer to the question presented on the slide. A plurality of users participates in the online meeting via their computing devices. For each slide in the sequence, individual users can cause relocation of one or more content items from the slide to a motion picture image sequence captured at that user's computing device. Thus, user devices can take turns acting as designated devices. In this example, a copy of a content item can be relocated to more than one motion picture image sequence. Thus, for example, an example content item can be relocated by each of multiple users to the multiple motion picture image sequences captured at the devices of the multiple users. The relocated content items for each slide can be pinned so that they continue to be displayed during display of subsequent slides. Thus, polling results for the multiple users can be generated through presentation of a sequence of slides and the relocation of content items from the slides to motion picture image sequences by individual users. The relocated content items indicate the answers selected by individual users for the questions presented by the sequence of slides. The motion picture image locations to which the individual content items are located indicate which users selected which answers. At the end of the sequence of sides, relocations, and pinnings, a visual record is created of each individual user's answers to the polling questions.

Computing Machine

Figure 14:
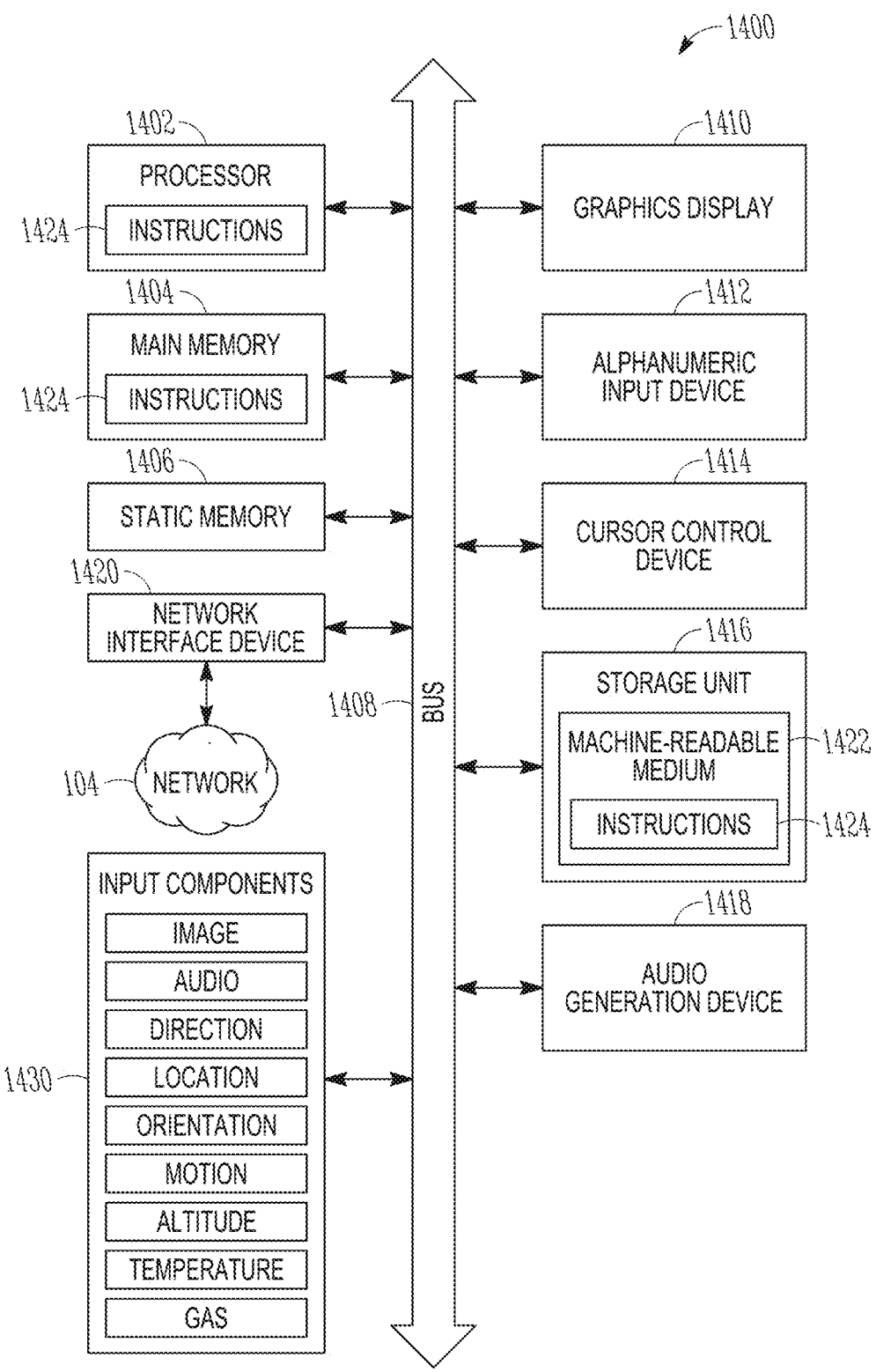
FIG. 14 illustrates components of a machine, according to some example embodiments

FIG. 14 illustrates components of a machine 1400, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 14 shows a diagrammatic representation of the machine 1400 in the example form of a computing device (e.g., a computer) and within which instructions 1424 (e.g., software, a program, an application, an applet, an app, or other executable code) for causing the machine 1400 to perform any one or more of the methodologies discussed herein may be executed, in whole or in part.

For example, the instructions 1424 may cause the machine 1400 to execute the flow diagrams of FIGS. 3-6, 7, 12. In one embodiment, the instructions 1424 can transform the general, non-programmed machine 1400 into a particular machine (e.g., specially configured machine) programmed to carry out the described and illustrated functions in the manner described.

In alternative embodiments, the machine 1400 operates as a standalone device or may be connected (e.g., networked) to other machines. In a networked deployment, the machine 1400 may operate in the capacity of a server machine or a client machine in a server-client network environment, or as a peer machine in a peer-to-peer (or distributed) network environment. The machine 1400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1424 (sequentially or otherwise) that specify actions to be taken by that machine. Further, while only a single machine is illustrated, the term "machine" shall also be taken to include a collection of machines that individually or jointly execute the instructions 1424 to perform any one or more of the methodologies discussed herein.

The machine 1400 includes a processor 1402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1404, and a static memory 1406, which are configured to communicate with each other via a bus 707. The processor 702 may contain microcircuits that are configurable, temporarily or permanently, by some or all of the instructions 724 such that the processor 1402 is configurable to perform any one or more of the methodologies described herein, in whole or in part. For example, a set of one or more microcircuits of the processor 1402 may be configurable to execute one or more modules (e.g., software modules) described herein.

The machine 1400 may further include a graphics display 1410 (e.g., a plasma display panel (PDP), a light emitting diode (LED) display, a liquid crystal display (LCD), a projector, or a cathode ray tube (CRT), or any other display capable of displaying graphics or video). The machine 1400 may also include an input device 1412 (e.g., a keyboard), a cursor control device 1414 (e.g., a mouse, a touchpad, a trackball, a joystick, a motion sensor, or other pointing instrument), a storage unit 1416, a signal generation device 1418 (e.g., a sound card, an amplifier, a speaker, a headphone jack, or any suitable combination thereof), and a network interface device 1420.

The storage unit 1416 includes a machine-storage medium 1422 (e.g., a tangible machine-readable storage medium) on which is stored the instructions 1424 (e.g., software) embodying any one or more of the methodologies or functions described herein. The instructions 1424 may also reside, completely or at least partially, within the main memory 1404, within the processor 1402 (e.g., within the processor's cache memory), or both, before or during execution thereof by the machine 1400. Accordingly, the main memory 1404 and the processor 1402 may be considered as machine-readable media (e.g., tangible and non-transitory machine-readable media). The instructions 1424 may be transmitted or received over a network 1426 via the network interface device 1420.

In some example embodiments, the machine 1400 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1404, 1406, and/or memory of the processor(s) 1402) and/or storage unit 1416 may store one or more sets of instructions and data structures (e.g., software) 1424 embodying or utilized by any one or more of the methodologies or functions described herein. These instructions, when executed by processor(s) 1402 cause various operations to implement the disclosed embodiments.

As used herein, the terms "machine-storage medium," "device-storage medium," "computer-storage medium" (referred to collectively as "machine-storage medium 1422") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1422 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1422 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1424 may further be transmitted or received over a communications network 1426 using a transmission medium via the network interface device 1420 and utilizing any one of a number of well-known transfer protocols (e.g., HTTP). Examples of communication networks 1426 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1424 for execution by the machine 1400, and includes digital or analog communications signals or other intangible medium to facilitate communication of such software.

In some embodiments, the network interface device 1420 comprises a data interface device that is coupled to one or more of an external camera 1430, an external microphone 1432, and an external speaker 1434 (e.g., external to the machine 1400). The camera 1430 may include a sensor (not shown) configured for facial detection and gesture detection. Any of the camera 1430, microphone 1432, and speaker 1434 may be used to conduct the presentation as discussed herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. An electronic presentation system comprising:
   one or more computer processors;
   one or more computer memories;
   a set of instructions incorporated into the one or more computer memories, the set of instructions configuring the one or more computer processors to perform operations comprising:
     causing display of a live motion picture image sequence (MPIS) captured at a first computing device, within image display regions of display screens at multiple computing devices;
     causing display of first multiple content items, on the display screens of the multiple computing devices;
     causing positioning of a first slide on the display screens of the multiple computing devices;
     wherein causing display of first multiple content items on the display screens at the multiple computing devices, includes causing display of the first multiple content items upon corresponding portions of the first slide;
     based at least in part upon receiving at the presentation management system from the first computing device, first relocation information indicating a first content item, from the first multiple content items, causing relocation of display of the of the first content item, to within the respective image display regions at the multiple computing devices; and
     positioning a first relocation slide, that is separate from the first slide and having a size less than the first slide, behind the relocated display of the first content item within the respective image display regions at the multiple computing devices.

2. The system of claim 1,
   wherein causing relocation of display of the first content item to within the respective image display regions, at the multiple computing devices includes, causing display of the first content item overlaying a portion of the MPIS displayed within the respective image display regions, at each of the multiple computing devices.

3. The system of claim 1,
   wherein the MPIS includes a corresponding real-time image of a respective user at the first computing device used to capture the MPIS.

4. The system of claim 1, the operations further including:
   wherein positioning the first relocation slide includes positioning a copy of a portion of the first slide corresponding to the relocated first display of the first content item, behind the relocated display of the first content item within the respective image display regions at the multiple computing devices; and
   causing the first relocation slide portion to be at least partially opaque, within the respective image display regions at the multiple computing devices.

5. The system of claim 4,
   wherein the first relocation information indicates dragging the first identified content item from the first slide at the first computing device to the first identified region MPIS at the first computing device.

6. The system of claim 4, wherein the operations further comprising:
   receiving over a network, at the presentation management system, the MPIS captured at a first computing device;
   sending over the network, to the multiple computing devices the MPIS.

7. The system of claim 4, wherein the operations further comprising:
   causing display of a placeholder representation of the relocated first content item within the first slide at the multiple user devices.

8. The system of claim 4, wherein the operations further comprising:
   causing display of a second slide on the displays of the multiple user devices;
   wherein the second slide includes second multiple content items; and
   causing display of the first content item within respective image display regions at the multiple user devices, while the second slide is displayed on the displays of the multiple user devices.

9. The system of claim 8, wherein the operations further comprising:
   receiving an indication of a user input at the first computing device, to select the second slide;
   wherein causing display of the second slide at the multiple user devices includes causing the display of the second slide at the multiple user devices, based at least in part upon receiving the indication of the user input device operation at the first computing device to select the second slide.

10. The system of claim 8, wherein the operations further comprising:
based at least in part upon receiving at the presentation management system from the first computing device, second relocation information indicating a second content item, from the second multiple content items within at the second slide, causing relocation of display of the of the second content item, at the multiple computing devices, to within the respective image display region; and
positioning a second relocation slide, that is separate from the second slide and having a size less than the second slide, behind the relocated display of the second content item within the respective image display regions at the multiple computing devices.

11. The system of claim 10, wherein the operations further comprising:
causing display of the first content item within the respective image display regions at the multiple user devices, while the second content item is displayed within the respective image display region at the multiple user devices.

12. An electronic presentation system comprising:
a presentation management system including:
one or more computer processors;
one or more computer memories;
a set of instructions incorporated into the one or more computer memories, the set of instructions configuring the one or more computer processors to perform operations comprising:
causing display of separate live motion picture image sequences (MPISs) captured at different ones of multiple computing devices, within separate image display regions of display screens at the multiple computing devices;
causing display of multiple content items on the display screens of the multiple computing devices;
causing positioning of a first slide on the display screens of the multiple computing devices;
wherein causing display of first multiple content items on the display screens of the multiple computing devices, includes causing display of the first multiple content items upon corresponding portions of the first slide;
based at least in part upon receiving at the presentation management system from a first one of the multiple computing devices, first relocation information indicating a first content item, from the multiple content items, and one of the image display regions, causing relocation of display of the of the first content item, at each of the multiple computing devices, to within the respective image display region indicated in the first relocation information;
positioning a first relocation slide that is separate from the first slide and having a size less than the first slide, behind the relocated display of the first content item within the respective image display regions at each of the multiple computing devices;
based at least in part upon receiving at the presentation management system from a second one of the multiple computing devices, second relocation information indicating a second content item, from the multiple content items, and one of the image display regions, causing relocation of display of the of the second content item, at each of the multiple computing devices, to within the respective image display region indicated in the second relocation information; and
positioning a second relocation slide that is separate from the first slide and having a size less than the first slide behind the relocated display of the second content item within the respective image display regions at each of the multiple computing devices.

13. The system of claim 12, wherein the operations further comprising:
receiving the separate MPISs over a network, at the presentation management system; and
sending the separate MPISs over the network, to the multiple computing devices.

14. The system of claim 12, wherein the operations further comprising:
wherein positioning the first relocation slide includes positioning a copy of a portion of the first slide, that corresponds to the relocated first display of the first content item, behind the relocated display of the first content item within the respective image display regions at the multiple computing devices;
causing the first relocation slide to be at least partially opaque, within the respective image display regions at the multiple computing devices;
wherein positioning the second relocation slide portion includes positioning a copy of a portion of the first slide, that corresponds to the relocated second display of the second content item, behind the relocated display of the second content item within the respective image display regions at the multiple computing devices; and
causing the second relocation slide to be at least partially opaque, within the respective image display regions at the multiple computing devices.

15. The system of claim 12,
wherein causing relocation of display of the first content item to within a respective second display region of the respective display screen of each of the multiple computing devices includes, causing display of the first content item overlaying a portion of a second MPIS displayed within the respective second display region at each of the multiple computing devices; and
wherein causing relocation of display of the second content item to within a respective third display region of the respective display screen of each of the multiple computing devices includes, causing display of the second content item overlaying a portion of a third MPIS displayed within the respective third display region at each of the multiple computing devices.

16. The system of claim 12,
wherein each MPIS including a corresponding real-time image of a respective user at a respective computing device used to capture the MPIS.

17. The system of claim 12 further including:
based at least in part upon receiving at the presentation management system from the first one of the multiple computing devices, third relocation information indicating association of a third content item selected from the multiple content items with the first one of the multiple MPISs, causing relocation of display of the third content item to within a respective first display region of the respective display screen of each of the multiple computing devices; and
positioning a third relocation slide, that is separate from the first slide and having a size less than the first slide, behind the relocated display of the third content item within the respective image display regions at each of the multiple computing devices.

18. The system of claim 17 further including:

based at least in part upon receiving at the presentation management system from the first one of the multiple computing devices, fourth relocation information indicating association of a fourth content item selected from the multiple content items with the second one of the multiple MPISs, causing display of the fourth content item within the respective second display region of the respective display screen of each of the multiple computing devices; and positioning a fourth relocation slide, that is separate from the first slide and having a size less than the first slide, behind the relocated display of the fourth content item within the respective image display regions at each of the multiple computing devices.

19. The system of claim 12 further including:

based at least in part upon receiving at the presentation management system from the first one of the multiple computing devices, third relocation information indicating association of a third content item selected from the multiple content items with the second one of the multiple MPISs, causing relocation of display of the third content item to within the respective second display region of the respective display screen of each of the multiple computing devices; and positioning a third relocation slide, that is separate from the first slide and having a size less than the first slide, behind the relocated display of the third content item within the respective image display regions at each of the multiple computing devices.

20. The system of claim 19 further including:

based at least in part upon receiving at the presentation management system from the first one of the multiple computing devices, fourth relocation information indicating association of a fourth content item selected from the multiple content items with the second one of the multiple MPISs, causing relocation of display of the fourth content item to within the respective second display region of the respective display screen of each of the multiple computing devices; and positioning a fourth relocation slide, that is separate from the first slide and having a size less than the first slide, behind the relocated display of the fourth content item within the respective image display regions at each of the multiple computing devices.

21. An electronic presentation system comprising:

a presentation management system including:

one or more computer processors;

one or more computer memories;

a set of instructions incorporated into the one or more computer memories, the set of instructions configuring the one or more computer processors to perform operations comprising:

causing display of the two or more motion picture image sequences (MPISs) within two or more corresponding image display regions of display screens at each of two or more computing devices;

causing display of multiple content items on the display screens of the two or more computing devices, separate from the MPISs;

causing positioning of a first slide on the display screens of the multiple computing devices, separate from the MPISs;

wherein causing display of first multiple content items on the display screens at the multiple computing devices, includes causing display of the first multiple content items upon corresponding portions of the first slide;

based at least in part upon receiving at presentation management system from a first one of the at least two or more computing devices, first relocation information indicating a first content item, from the multiple content items, and one of the two or more image display regions, causing relocation of display of the of the first content item, at each of the two or more computing devices, to within the respective image display region indicated in the first relocation information;

positioning a first relocation slide, that is separate from the first slide and having a size less than the first slide, behind the relocated display of the first content item within the respective image display regions at the multiple computing devices; and based at least in part upon receiving at presentation management system from a second one of the at least two or more computing devices, second relocation information indicating a second content item, from the multiple content items, and one of the two or more image display regions, causing relocation of display of the of the second content item, at each of the two or more computing devices, to within the respective image display region indicated in the second relocation information; and positioning a second relocation slide, that is separate from the first slide and having a size less than the first slide, behind the relocated display of the first content item within the respective image display regions at the multiple computing devices.

22. The system of claim 21, wherein the operations further comprising:

receiving the two or more MPISs over a network, at the presentation management system; and sending the two or more MPISs over the network, to the two or more computing devices.

23. The system of claim 21, wherein positioning the first relocation slide includes positioning a copy of a portion of the first slide corresponding to the relocated first display of the first content item, behind the relocated display of the first content item within the respective image display regions at the multiple computing devices; and further comprising:

causing the first relocation slide to be at least partially opaque, within the respective image display regions at the multiple computing devices.

24. The system of claim 21, wherein causing relocation of display of the first content item to within the respective image display region indicated in the first relocation information of each of the multiple computing devices includes, causing display of the first content item overlaying a portion of an MPIS displayed within the respective image display region, indicated in the first relocation information, at each of the multiple computing devices;

wherein causing relocation of display of the second content item to within the respective image display region indicated in the second relocation information of each of the multiple computing devices includes, causing display of the second content item overlaying a portion of an MPIS displayed within the respective image display region, indicated in the second relocation information, at each of the multiple computing devices.

25. The system of claim 21,
wherein each MPIS including a corresponding real-time image of a respective user at a respective computing device used to capture the MPIS.

26. The system of claim 21,
wherein the respective image display region indicated in the first relocation information corresponds to the first one of the at least two or more computing devices; and
wherein the respective image display region indicated in the second relocation information corresponds to the second one of the at least two or more computing devices.

27. The system of claim 21, further including:
based at least in part upon receiving at presentation management system from a third one of the at least two or more computing devices, third relocation information indicating a third content item, from the multiple content items, and one of the two or more image display regions, causing relocation of display of the of the third content item, at each of the two or more computing devices, to within the respective image display region indicated in the third relocation information; and
positioning a third relocation slide, that is separate from the first slide and having a size less than the first slide, behind the relocated display of the first content item within the respective image display regions at the multiple computing devices.

28. The system of claim 27,
wherein the respective image display region indicated in the first relocation information corresponds to the first one of the at least two or more computing devices;
wherein the respective image display region indicated in the second relocation information corresponds to the second one of the at least two or more computing devices; and
wherein the respective image display region indicated in the third relocation information corresponds to the third one of the at least two or more computing devices.

29. The system of claim 21, further including:
based at least in part upon receiving at presentation management system from the first one of the at least two or more computing devices, third relocation information indicating a third content item, from the multiple content items, and one of the two or more image display regions, causing relocation of display of the of the third content item, at each of the two or more computing devices, to within the respective image display region indicated in the third relocation information; and
positioning a third relocation slide, that is separate from the first slide and having a size less than the first slide, behind the relocated display of the first content item within the respective image display regions at the multiple computing devices.

30. The system of claim 29,
wherein the respective image display region indicated in the third relocation information corresponds to a third one of the at least two or more computing devices.

31. The system of claim 29,
wherein the respective image display region indicated in the first relocation information corresponds to the first one of the at least two or more computing devices;
wherein the respective image display region indicated in the second relocation information corresponds to the second one of the at least two or more computing devices; and
wherein the respective image display region indicated in the third relocation information corresponds to the first one of the at least two or more computing devices.

32. The system of claim 29,
wherein the respective image display region indicated in the first relocation information corresponds to one of the at least two or more computing devices other than the first one of the at least two or more computing devices;
wherein the respective image display region indicated in the second relocation information corresponds to one of the at least two or more computing devices other than the second one of the at least two or more computing devices; and
wherein the respective image display region indicated in the third relocation information corresponds to one of the at least two or more computing devices other than the third one of the at least two or more computing devices.

33. The system of claim 21,
wherein the respective image display region indicated in the first relocation information corresponds to the second one of the at least two or more computing devices.

34. The system of claim 21,
wherein the respective image display region indicated in the first relocation information corresponds to the second one of the at least two or more computing devices; and
wherein the respective image display region indicated in the second relocation information corresponds to the first one of the at least two or more computing devices.

35. The system of claim 21,
wherein the respective image display region indicated in the first relocation information corresponds to a third one of the at least two or more computing devices.

* * * * *

UNITED STATES PATENT AND TRADEMARK OFFICE
CERTIFICATE OF CORRECTION

| | | |
|---|---|---|
| PATENT NO. | : 11,704,626 B2 | |
| APPLICATION NO. | : 17/532399 | |
| DATED | : July 18, 2023 | |
| INVENTOR(S) | : Somlai-Fischer et al. | |

It is certified that error appears in the above-identified patent and that said Letters Patent is hereby corrected as shown below:

On the Title Page

In Column 2, under Item "(57) Abstract", Lines 13-14, delete "of the of the" and insert --of the-- therefor In the Claims In Column 34, Line 5, in Claim 1, delete "of the of the" and insert --of the-- therefor In Column 35, Line 11, in Claim 10, delete "of the of the" and insert --of the-- therefor In Column 35, Line 53, in Claim 12, delete "of the of the" and insert --of the-- therefor In Column 35, Line 67, in Claim 12, delete "of the of the" and insert --of the-- therefor In Column 38, Line 10, in Claim 21, delete "of the of the" and insert --of the-- therefor In Column 38, Line 26, in Claim 21, delete "of the of the" and insert --of the-- therefor In Column 39, Lines 22-23, in Claim 27, delete "of the of the" and insert --of the-- therefor In Column 39, Lines 49-50, in Claim 29, delete "of the of the" and insert --of the-- therefor Signed and Sealed this
Third Day of October, 2023

*Katherine Kelly Vidal*

Katherine Kelly Vidal
*Director of the United States Patent and Trademark Office*